United States Patent [19]

Yun et al.

[11] 4,226,754
[45] Oct. 7, 1980

[54] SYNTHETIC POLYMER

[75] Inventors: Han B. Yun, Princeton Junction; Alfred J. Whitton, Hightstown, both of N.J.

[73] Assignee: NL Industries, Inc., New York, N.Y.

[21] Appl. No.: 913,898

[22] Filed: Jun. 8, 1978

[51] Int. Cl.³ .......................... C09D 3/74; C09D 3/80; C09D 5/02; C08F 220/06
[52] U.S. Cl. .......................... 260/29.6 TA; 526/218; 526/224; 526/229; 526/240; 526/303; 526/317
[58] Field of Search ................ 260/29.6 TA; 526/317, 526/240

[56] References Cited

U.S. PATENT DOCUMENTS

| | | | |
|---|---|---|---|
| 2,763,578 | 9/1956 | Simons | 260/29.6 TA |
| 2,790,735 | 4/1957 | McLaughlin et al. | 260/29.6 TA |
| 3,652,480 | 3/1972 | Coker | 260/29.6 TA |
| 3,654,213 | 4/1972 | Christenson et al. | 526/317 |
| 3,894,980 | 7/1975 | DeTommaso | 260/29.6 TA |
| 3,900,663 | 8/1975 | Barabas et al. | 260/29.6 TA |
| 3,926,888 | 12/1975 | Cheung et al. | 526/317 |

FOREIGN PATENT DOCUMENTS

| | | | |
|---|---|---|---|
| 623617 | 7/1961 | Canada | 260/29.6 TA |
| 2420356 | 11/1974 | Fed. Rep. of Germany | 260/29.6 TA |
| 46-26240 | 7/1971 | Japan | 260/29.6 TA |
| 46-39240 | 11/1971 | Japan | 526/317 |
| 48-12855 | 4/1973 | Japan | 260/29.6 TA |

*Primary Examiner*—Joseph L. Schofer
*Assistant Examiner*—Herbert J. Lilling
*Attorney, Agent, or Firm*—Gary M. Nath

[57] ABSTRACT

There is provided a synthetic polymer useful as a thickener in aqueous compositions. The polymer preferably comprises the reaction product of methacrylic acid, methyl methacrylate and vinyl acetate in certain specified proportions. The thickener is particularly effective in latex paint formulations.

23 Claims, 1 Drawing Figure

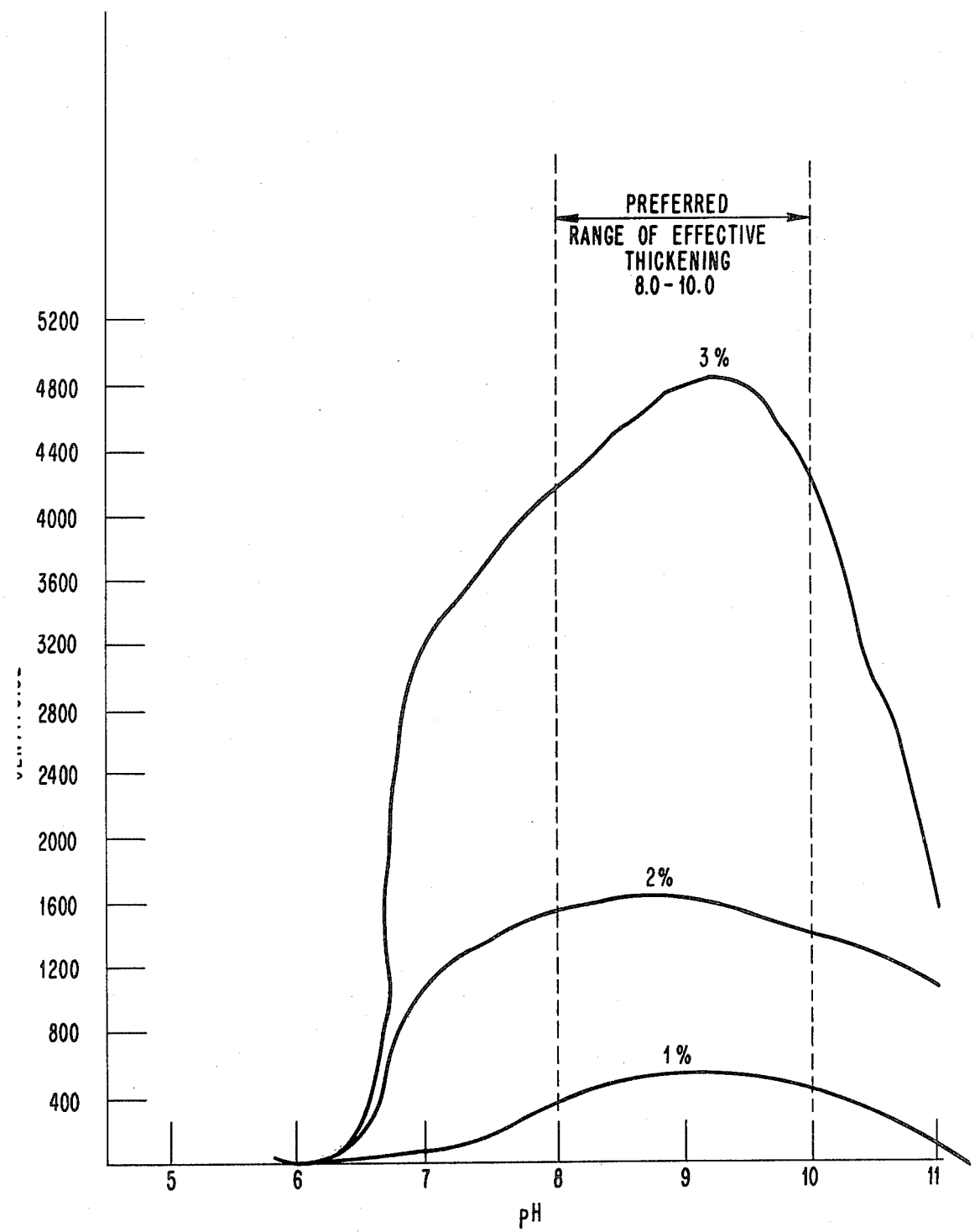

SYNTHETIC POLYMER

BACKGROUND OF THE INVENTION

Compounds known as thickeners are commonly employed in a variety of compositions to provide thickening effects, such as in aqueous compositions, more particularly aqueous coating compositions, and still more particularly latex paint compositions.

The term "latex" has a meaning well known in the art and is used to designate an aqueous dispersion, suspension or emulsion of a water-insoluble polymer in water.

Aqueous compositions which generally employ thickeners include paints, other coating compositions such as coatings for paper, textile, upholstery fabric, rug, carpet backs, and the like, inks, adhesives, cosmetics, etc. Most of these aqueous compositions require the use of a thickening material to improve rheological properties such as to obtain a proper viscosity in order to maintain pigments, binders and other solids dispersed, suspended or emulsified therein, to obtain suitable flow properties, and to obtain good compatability.

A particularly important use of thickeners is in latex paint compositions. Cellulosics, particularly hydroxyethyl cellulose (HEC), have dominated the latex paint thickener market almost since the inception of latex paint twenty-five years ago. Hydroxyethyl cellulose is a nonionic water soluble material that thickens and stabilizes many water-based paint systems. Hydroxyethyl cellulose, however, suffers from many disadvantages. For example, hydroxyethyl cellulose is commonly sold as a solid. Consequently, it must generally be carefully pre-dispersed or dissolved in water or glycol before adding it to the paint formulation. Hydroxyethyl cellulose swells rapidly. Thus, it easily forms lumps, which are not readily dispersed during the pigment grinding stage when the HEC is added as a solid. Predispersion or dissolution of solid thickening agents of this type typically requires careful addition, long mixing times and dilution, thereby adding additional steps to the paint formulation scheme, which in turn increases the paint processing cost. It would be much more advantageous if a thickening agent could be provided in a liquid form (e.g., emulsion) thereby permitting its addition subsequent to the pigment dispersion (i.e., during the letdown stage or by post-addition). The post-addition method holds the greatest advantages for formulation flexibility, the capability of easy final viscosity adjustment, and less troublesome pigment dispersion, which are of prime importance to most paint manufacturers.

Another disadvantage of hydroxyethyl cellulose thickeners is that they are subject to bacterial and enzyme attack which results in spoilage (putrefaction) of the paint, loss of viscosity and other flow properties, and therefore require use of anti-biodegradation preservatives in paint.

The search has therefore continued for a thickener which (1) can be employed as a post-additive, directly to aqueous compositions, particularly latex paint compositions, (2) is non-biodegradable, and (3) yields a lower cost/performance ratio with respect to the overall manufacturing and rheological properties of a latex paint composition into which it is incorporated, such as in addition to thickening action, spattering resistance, hiding, gloss retention, leveling and stain removal, when compared to cellulosic materials.

The present invention was developed in response to this search.

It is therefore an object of the presently claimed invention to provide a thickener for aqueous compositions, particularly aqueous coating compositions, and more particularly latex paint compositions.

Other objects and advantages of this invention will become apparent from the following summary and description of the preferred embodiments of the present invention.

BRIEF DESCRIPTION OF THE DRAWING

The FIGURE illustrates the relationship of the viscosity as a function of the pH when the thickener of the present invention is added to water. A terpolymer of vinyl acetate, methyl methacrylate, and methacrylic acid prepared by emulsion polymerization using a monomer weight ratio of 40 VA/30 MMA/30 MAA is used as the thickening material. The FIGURE contains three separate graphs obtained by plotting the viscosity against pH of aqueous compositions containing the terpolymer at three different levels of concentration, i.e., 1%, 2% and 3%, respectively. The viscosity is measured by using a Brookfield Model RVF viscometer at 50 rpm.

SUMMARY OF THE INVENTION

In accordance with the present invention there is provided a polymer of (a) from about 15 to about 35% by weight, of methacrylic acid, (b) from about 5 to about 70% by weight, of at least one ester of methacrylic acid represented by the structural formula:

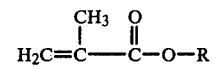

wherein R is saturated or unsaturated and represents an alkyl group having from 1 to 20 carbon atoms, and (c) from about 5 to about 80% by weight, of at least one vinyl ester of a saturated aliphatic carboxylic acid, wherein the acid has from 1 to 10 carbon atoms. All indicated amounts are by weight and based upon the total weight of the monomer components of the polymer.

In another aspect of the present invention there is provided an emulsion of the above-defined polymer in water, which emulsion is useful as a thickening agent in aqueous compositions. In order to obtain the thickening effect, the polymer must be dissolved in the aqueous composition to be thickened. This is accomplished by adjusting, if necessary, the pH of the resulting polymer containing aqueous composition to a pH between about 6.2 and about 12.

In still another aspect of the present invention there is provided an improved aqueous composition, and more particularly an improved latex paint composition containing the above-defined polymer and having a pH between about 6.2 and about 12.

In a still even further aspect of the present invention there is provided a process for thickening an aqueous composition which comprises adding the above-defined polymer to an aqueous composition and adjusting, if necessary, the pH of the polymer containing aqueous composition to a pH at which thickening occurs, generally between about 6.2 and about 12.

DESCRIPTION OF THE PREFERRED EMBODIMENTS

The polymer of the present invention is provided by polymerizing three different monomer units in certain specified amounts. More specifically, the monomers from which the polymer, which preferably is a terpolymer, is prepared, comprises the following monomer components:

(A) Methacrylic acid;
(B) At least one ester of methacrylic acid represented by the structural formula:

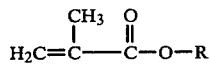

wherein R is unsaturated or preferably saturated and represents an alkyl group having from 1 to 20, and preferably from 1 to 12 carbon atoms. The alkyl group may contain halogen, hydroxyl and other substituents which do not interfere with the polymerization reaction or the resulting properties of the polymer; and (C) At least one vinyl ester of a saturated aliphatic carboxylic acid, wherein the acid contains from 1 to 10, and preferably from 1 to 6 carbon atoms.

Representative examples of suitable methacrylic acid esters include methyl methacrylate, ethyl methacrylate, propyl methacrylate, isopropyl methacrylate, butyl methacrylate, n-amyl methacrylate, sec-amyl methacrylate, hexyl methacrylate, lauryl methacrylate, stearyl methacrylate, ethyl hexyl methacrylate, crotyl methacrylate, cinnamyl methacrylate, oleyl methacrylate, ricinoleyl methacrylate, hydroxy ethyl methacrylate, hydroxy propyl methacrylate, and the like, and mixtures thereof.

The preferred methacrylic acid ester is methyl methacrylate.

Representative examples of suitable aliphatic carboxylic acid vinyl esters include vinyl acetate, vinyl propionate, vinyl butyrate, vinyl tert-butyrate, vinyl caprate, vinyl stearate, vinyl laurate, vinyl oleate, and the like, and mixtures thereof.

The preferred vinyl ester is vinyl acetate.

Other monomers, which do not fall within the description of monomer groups A, B, or C above may be employed in minor amounts (e.g., up to about 5% by weight of the total monomers used) provided they do not adversely affect the basic and novel characteristics of the polymer of the present invention.

In order to achieve the desired properties of the polymer of the present invention it is important that the monomers (i.e., A, B and C) be polymerized together in certain specified proportions.

Thus, in preparing the polymer described herein it is necessary that methacrylic acid be employed in amounts of from about 15 to about 35%, preferably from about 20 to about 35%, and most preferably about 30% by weight, based on the total weight of the monomers used. If the methacrylic acid is employed in amounts exceeding about 35% by weight, the resulting polymer becomes increasingly more difficult to emulsify in water. If the amount of methacrylic acid is less than about 15% by weight, the resulting polymer becomes increasingly more difficult to dissolve in water.

As mentioned above, and discussed more fully hereinafter, the polymer of the present invention must be dissolved in the aqueous composition to be thickened in order to cause the thickening effect. Dissolution of the polymer in water has been found to occur at a pH of between about 6.2 and about 12 (e.g., between about 6.5 and about 11), preferably between about 7 and about 11, and more preferably between about 8 and about 10. The pH values refer to the pH of the polymer containing aqueous composition being thickened.

The esters of methacrylic acid are employed in amounts of from about 5 to about 70%, preferably from about 10 to about 50%, and most preferably about 30% by weight, based on the total weight of monomers used. If the amount of the methacrylic acid ester employed exceeds about 70% by weight, then the resulting polymer becomes increasingly more difficult to dissolve in water. If the amount of the methacrylic acid ester is less than about 5% by weight, the resulting polymer becomes increasingly more difficult to emulsify in water.

The vinyl ester of the saturated aliphatic carboxylic acid is employed in amounts of from about 5 to about 80%, preferably from about 20 to about 60%, and most preferably about 40% by weight, based on the total weight of monomers used.

The percentage content by weight of the sum of the monomers used to prepare the polymer is 100%.

The preferred polymer is a terpolymer prepared from a mixture of monomers consisting of methacrylic acid (30%), methyl methacrylate (30%), and vinyl acetate (40%), based on the total monomer weight.

The monomers described above should be reacted as completely as possible during polymerization. It will be understood that since it is possible to obtain a % monomer conversion of from about 95 to about 99.5%, the resulting polymer should be a random interpolymer wherein the monomers employed are incorporated into the polymer at a weight ratio which is substantially the same as the initial monomer weight ratio employed during polymerization.

The polymer may be prepared by polymerizing the monomers in the amounts specified by any conventional method known in the art such as by solution, suspension, or emulsion polymerization on a batch, continuous or semi-continuous basis.

Emulsion polymerization is preferred since this route leads to an emulsion of the polymer which can be used directly in providing thickened aqueous compositions, particularly thickened latex paint compositions.

Typical aqueous emulsion polymerization techniques employ an appropriate emulsifying agent for emulsifying the monomers and for maintaining the polymer obtained in an emulsified condition.

In a preferred embodiment, emulsion polymerization is conducted in the following manner. A reactor is charged with deionized water and heated. When the temperature of the water in the reactor reaches about 50° C., a suitable emulsion polymerization catalyst is added. When the temperature reaches about 70° C., about 10% of the total amount of emulsifier to be employed during polymerization is added.

The amount of water initially charged into the reactor represents about 50% by weight of the total amount of water employed during emulsion polymerization. The total amount of water which is eventually charged into the reactor is dictated by the concentration of polymer solids desired in the polymer emulsion product or final reaction mixture.

Typically, the polymer solids content of the final reaction mixture should not exceed about 50%, and conveniently is from about 25 to about 35%, and most preferably about 30% by weight, based on the weight of the resulting polymer emulsion. Lower solids concentrations can also be used, but are generally undesirable from an economic standpoint. The particular solids content obtained will normally depend on the end use to which the polymer emulsion will be applied. Most preferably, when the polymer emulsion resulting from emulsion polymerization is to be added directly to a latex paint formulation, the polymer is present therein in an amount of about 25 to about 35% (e.g., about 30%) by weight, based on the total weight of the emulsion. If the total polymer solids content of the final reaction mixture exceeds about 50% by weight, the polymer coagulates in the water and no longer exists as an emulsion.

The emulsion polymerization catalyst used may be any one of the free radical yielding initiators such as the inorganic persulfates, percarbonates, perborates, and the like, e.g., potassium persulfate, ammonium persulfate or sodium persulfate, organic peroxides, e.g., benzoyl peroxide, acetyl peroxide or di-t-butyl peroxide, azobisisobutylnitriles, and organic hydroperoxides such as diisopropylbenzene hydroperoxide, and the like, which are usually employed in free radical type polymerization systems. Preferably, ammonium persulfate is employed as the catalyst. Redox systems of initiation may also be employed utilizing the above noted initiators with suitable reducing agents well known in the polymerization art. Mixtures of the above catalysts may also be used. The amount of catalyst used is normally in the range of from about 0.01 to about 5.0 parts by weight, and preferably from about 0.05 to about 0.5 parts by weight, per 100 parts by weight of the total monomeric material to be reacted.

Any suitable emulsifier used by those skilled in the art may be employed to prepare the polymer including the anionic and non-ionic types. Exemplary anionic emulsifiers which may be employed include alkali metal and ammonium salts of the sulfates of alcohols having from 8 to 18 carbon atoms such as sodium lauryl sulfate, ethanolamine lauryl sulfate and ethylamine lauryl sulfate, alkali metal and ammonium salts of sulfonated petroleum or paraffin oils, sodium salts of aromatic sulfonic acids such as dodecane-1-sulfonic acid and octadiene 1-sulfonic acid, aralkylsulfonates such as sodium isopropyl benzene sulfonate, sodium dodecyl benzene sulfonate and sodium isobutyl naphthalene sulfonate, alkali metal and ammonium salts of sulfonated dicarboxylic acid esters such as sodium dioctyl sulfosuccinate and disodium N-octadecylsulfosuccinamate, alkali metal or ammonium salts of free acids of complex organic mono and diphosphate esters, and the like. So-called non-ionic emulsifiers such as octyl or nonylphenyl polyethoxyethanol, and the like, may also be used. Mixtures of the above may also be employed.

The most preferred emulsifier is the disodium ethoxylated alcohol ($C_{10}$–$C_{12}$) half ester of sulfosuccinic acid available from American Cyanamid Company under the tradename AEROSOL A-102 ™ or the disodium ethoxylated nonylphenol half esters of sulfosuccinic acid (AEROSOL A-103 ™). An alternative preferred emulsifier is the sodium salt of an alkylaryl polyether sulfonate available from Rohm and Haas Company under the tradename TRITON X-200 ™.

Although any effective amount of emulsifier sufficient to emulsify the monomers and the resulting polymer may be used, it is preferred that such effective amount constitutes from about 0.1 to about 20 parts by weight, and preferably from about 0.5 to about 10 parts by weight of emulsifier, per 100 parts by weight of the total monomers to be reacted. As stated above, only about 10% of the total amount of emulsifier to be employed is initially charged to the polymerization reactor. The remaining amount is added with the monomer charge as discussed below.

The reactor having the water, catalyst, and emulsifier present therein is typically equipped with any conventional means for agitation.

A holding tank above the charged polymerization reactor contains the remaining 50% by weight of the total amount of water to be employed. The monomers to be polymerized are then added to the holding tank and pre-emulsified (with stirring), conveniently under ambient conditions, by adding the remaining 90% of the total emulsifier thereto. When the pre-emulsion technique is not used, the monomers, after being mixed, may be added directly to the polymerization reactor containing all of the water, catalyst and emulsifier to be used.

It is to be understood that the presence of oxygen is detrimental to the desired emulsion polymerization reaction. Accordingly, nitrogen is normally used to purge the pre-emulsified monomers in the holding tank as well as the contents of the polymerization reactor in accordance with conventional procedures such as by bubbling nitrogen gas through the contents of the holding tank and polymerization reactor. Typically, a continuous nitrogen purge is used in both the reactor and the holding tank until the polymerization reaction is completed. Other inert gases such as carbon dioxide, helium, and the like, may also be used in place of the nitrogen, also in accordance with conventional procedures.

After the monomers are pre-emulsified, which generally takes from about 5 to about 30 minutes or more, the pre-emulsion is then added to the polymerization reactor. The method of addition of the pre-emulsion to the polymerization reactor generally follows conventional exothermic emulsion polymerization procedures. Typically, a portion of the total pre-emulsion is added initially to the polymerization reactor and then increments of additional pre-emulsion are added as the polymerization reaction is in progress.

Desirably, the polymerization temperature is maintained as close as possible, but below the lowest of the boiling points of the monomer materials charged. Obviously, if the temperature exceeds this lowest boiling point some of the monomeric material will be vaporized and the desired polymer will not be obtained. Agglomeration problems are frequently encountered if the polymerization temperature rises too rapidly. Accordingly, the rate of addition of pre-emulsion is controlled so as to avoid these problems.

As mentioned, the polymerization reaction temperature is maintained as close as possible but below the lowest of the monomer boiling points. When vinyl acetate, methyl methacrylate and methacrylic acid are polymerized, this temperature is about 70° C. (vinyl acetate boils at 72° C.).

Lower temperatures may be employed, however, but are not preferred because slower reaction rates may result depending on the particular catalyst used.

The rate of pre-emulsion addition will primarily be dictated by the rate of heat evolution in the reaction mixture, which, in turn, will be influenced by the nature of the reactants, i.e., their heats of reaction, the efficiency of any cooling jacket of the reactor, the temperature at which it is desired to run the reaction, and the like. Frequently, the rate of heat evolution in the reaction mixture is usually more rapid in the early stages of the pre-emulsion addition than in the latter stages. While it is possible to obtain reasonably good temperature control of the reaction mixture by a single steady rate of addition of pre-emulsion, it may be desirable to increase the rate of pre-emulsion addition toward the latter stages of the reaction.

Typically, the rate of monomer addition is selected so that it is equal to or slower than the polymerization reaction rate at the temperature employed. This insures that by the end of monomer addition substantially all of the monomer has reacted.

At the completion of monomer addition the reaction temperature is normally raised about 10° to about 20° C. for a period of about 30 to 60 minutes or more, to insure completion of the reaction.

It will be understood that the pressure employed during the polymerization reaction will depend in part upon the vapor pressure of the monomers used and the temperatures required to obtain acceptable rates of polymerization with the selected catalyst. Preferably, the pressure employed is atmospheric, although higher and lower pressures may be used if desired.

While the above description of emulsion polymerization is a preferred way of making the polymer of the present invention, it is to be understood that any other method or variation of the emulsion polymerization technique well known to those skilled in the art may be employed.

The resulting polymer will exhibit an intrinsic viscosity (I.V.) of about 1.0 to about 4.0 deciliters per gram (dl/gm), preferably from about 1.5 to about 3.5 dl/gm, and most preferably from about 2 to about 3 dl/gm.

The above intrinsic viscosities will generally correspond to weight average molecular weights of about 500,000 to about 7,300,000, preferably from about 1,100,000 to about 6,000,000, and most preferably from about 2,000,000 to about 4,200,000.

The weight average molecular weights are determined from the equation:

$$I.V. = 9.2 \times 10^{-4} \overline{m_w}^{0.53}$$

wherein I.V. is the intrinsic viscosity, $\overline{m_w}$ is the weight average molecular weight. [See, *Polymer Science*, USSR 12, 702–9 (1970)].

The "intrinsic viscosity" as employed herein is determined from the equation:

$$I.V. = lim/(C \to 0)(n_{sp}/C)$$

wherein $n_{sp}$ is the specific viscosity obtained from the equation $n_{sp} = t - t_o/t_o$, wherein t is the flow time of a dilute solution of the polymer in a one half normal potassium iodide/dimethyl formamide solvent through a viscometer capillary, and $t_o$ is the flow time of the solvent alone through the same viscometer capillary. "C" is the concentration of the polymer in the solvent (i.e., 0.1 to 0.02 parts by weight of the polymer per 100 parts by weight of the solvent). All I.V. determinations are made at 25° C.

If desired, conventional chain transfer agents may be used in the polymerization reaction to minimize or prevent undue polymer chain growth or cross-linking and resultant molecular weight increases. The chain transfer agents are typically first dissolved in the monomers before the monomers are added to the polymerization reactor or emulsified, in the case of the pre-emulsion technique. Suitable chain transfer agents include mercaptans, for example, alkyl thiols and aromatic thiols such as dodecane thiol, butane thiol, octyl thiol and benzene thiol. Normally, these agents are used in an amount of from about 0.05 to about 5 parts by weight of chain transfer agent, per 100 parts by weight of the total monomers to be reacted.

The polymer prepared in accordance with the above-described emulsion polymerization procedure will typically achieve a % monomer conversion of from about 95 to about 99.5% by weight, based on the weight of total monomers used.

The resulting aqueous emulsion may be used directly as a thickener for aqueous compositions, i.e., the catalyst, and/or any unreacted monomer need not be removed. In some instances, however, it may be desirable to filter the resulting polymer emulsion prior to use in order to remove large polymer particles, if present, such as by passing the cooled polymer emulsion reaction product through a 100 mesh or finer stainless steel or cotton screen. The larger polymer particles generally take more time to dissolve or disperse in the aqueous composition to be thickened.

In a preferred embodiment, additional emulsifier, and preferably the same emulsifier as used during polymerization, is added to the resulting polymer emulsion to improve its stability at low temperatures, e.g., 0° C. For example, the amount of additional emulsifier added to a 30% by weight polymer solids containing emulsion is about 5 to about 10%, and preferably about 6.5% by weight, based on the weight of the emulsion. The additional emulsifier is helpful for freeze/thaw stabilization purposes when the polymer is marketed in emulsified form.

Alternatively, if desired, the emulsified polymer may be converted to solid form, preferably a powder. This can be done by one of two techniques. First, the resulting emulsion can be neutralized by the addition of any organic or inorganic basic material that will enable the resulting polymer salt to be recovered in solid form. Preferably, sodium hydroxide, potassium hydroxide, sodium carbonate, triethanolamine, and the like are used. After neutralization, the water is removed by drying such as by heating in a vacuum oven at a temperature of from about 50° to about 60° C., for about 10 to about 20 hours, followed by conversion of the resulting solid polymer salt (such as by grinding) to a convenient particle size (20 mesh or less) for further use. Secondly, the polymer solids can be recovered by simply removing the water from the resulting polymer emulsion such as by spray or drum drying. This results in a fine powder solid, making further size reduction unnecessary.

The polymer product of the present invention, whether used as an aqueous polymer emulsion, solid or solution, will thicken aqueous compositions, particularly aqueous coating compositions, and more particularly latex paint compositions upon dissolution of the polymer in the aqueous composition to be thickened. As previously mentioned, dissolution of the polymer occurs when the pH of the resulting aqueous composition to which it is added is, or is adjusted to be, between about 6.2 and about 12, preferably between about 7 and about 11, and more preferably between about 8 and about 10 (e.g., about 9).

At a pH of less than about 6.2, more particularly 4.0 to 5.0 (e.g., 4.5), the polymer is substantially insoluble in water and can exist in emulsified form as evidenced by the emulsion which results from emulsion polymerization. The pH of the emulsion resulting from the above-described emulsion polymerization process is typically between about 4.0 and about 4.5 when vinyl acetate, methyl methacrylate and methacrylic acid are used as the monomers.

Referring to the FIGURE, which plots viscosity against the pH of a mixture of the polymer in water at three different polymer concentrations, it will be seen that as the pH of the mixture is raised from about 6.2 to about 8.0, the viscosity of the mixture is radically increased. The thickening effect appears to maximize at a pH of about 8.0 to about 10.0 with a maximum occurring at about 9.0.

By way of explanation it is believed that as the pH of the aqueous composition containing the polymer is raised, the initially insoluble polymer chains begin to swell and eventually dissolve in the water. Although the exact mechanism by which the polymer causes the thickening effect is not clearly understood, it is believed that the thickening effect is directly proportional to the amount of polymer dissolved in the aqueous composition. The amount of polymer which dissolves in the aqueous composition is in turn a function of pH and the amount of polymer solids in the aqueous composition to be thickened.

Preferably, the resulting aqueous emulsion recovered from the emulsion polymerization process is used as the thickener, since it is a liquid and overcomes the problems inherent in the use of solid thickeners now on the market. The emulsion form is also preferred over a solution of the polymer because a higher concentration of the insoluble emulsified polymer can be employed without obtaining the thickening effect associated with a polymer solution at comparable high concentrations. Thus, the emulsified form facilitates handling, and promotes efficiency while still maintaining the advantages of the liquid state. In short, while it is within the scope of the present invention that the solution or solid (e.g., powder) form of the polymer may be employed to thicken aqueous compositions, they are not often as practical as the emulsion form.

In many instances sufficient base will be present in the aqueous composition to be thickened to dissolve the polymer and obtain the above-mentioned pH values and associated thickening effect.

If sufficient base is lacking in the aqueous composition to be thickened it will be necessary to adjust the pH of the composition so as to dissolve the polymer therein by adding base thereto.

The pH of the aqueous composition to which the polymer emulsion is added may be raised by any suitable organic or inorganic base such as sodium hydroxide, potassium hydroxide, magnesium hydroxide, ammonium hydroxide, sodium bicarbonate and carbonate, ammonium carbonate, triethanolamine, diethanol amine, potassium triphosphate, potassium carbonate, lithium hydroxide and carbonate, calcium hydroxide, strontium hydroxide, etc., and mixtures thereof. The preferred base is ammonium hydroxide. In short, any basic material may be used which does not adversely affect the aqueous composition to which it is added.

The amount of the polymer thickener that may be dissolved in any given aqueous composition may fall within a wide range depending on the particular viscosity desired.

Thus, although any effective amount of the polymer thickener may be employed for dissolution, typically from about 0.05 to about 20%, preferably from about 0.1 to about 5%, and most preferably from about 0.1 to about 3% by weight, based on the weight of the final aqueous composition including polymer is used.

For latex paint compositions, the polymer may be dissolved therein in an amount of from about 0.05 to about 5%, and preferably from about 0.1 to about 3% by weight, based on the weight of the total composition including polymer.

The polymers of the present invention may be employed as thickeners for controlling viscosity of any aqueous based composition. An aqueous based composition is an aqueous composition as herein defined to be a composition wherein water comprises at least 10% by weight of the total composition (including 100% water).

For example, aqueous dispersions, emulsions, suspensions, solutions, slurries and the like, may be thickened by the subject polymers.

The viscosity of the aqueous compositions obtainable with the polymer thickener will depend on the amount of polymer dissolved in the aqueous composition which in turn depends on the final pH of the aqueous composition as described above. Thus, the viscosity of a polymer present in water in an amount of about 1 to about 3% by weight, based on the weight of the water and polymer, can achieve viscosities of from about 400 to about 5000 centipoise (cps) as determined from a Brookfield Model RVF viscometer at 50 rpm. When the pH of the composition is varied between the preferred range of about 8 to about 10 as illustrated by the FIGURE. Higher and lower viscosities can be obtained as will be obvious from the discussion provided herein.

Typical aqueous compositions include compositions to be applied to textiles such as latex adhesives, warp sizes, backings for rugs and other pile fabrics. The polymer thickener may also be used when thickening is desired in the purification of raw water such as the saline water used in the recovery of oil from exhausted oil wells by water flooding techniques. Other aqueous compositions to which the polymer can be added for thickening purposes include drilling muds, caulks adhesives, cosmetics, coating compositions such as paper coatings, furniture finishes, ink compositions, latex paints, foundry core washes, and the like.

Preferably, the polymer is used to thicken aqueous coating compositions, and more preferably latex paint compositions.

Examples of suitable latex paint compositions include those based on resins or binders of acrylonitrile, copolymers of acrylonitrile wherein the comonomer is a diene like isoprene, butadiene or chloroprene, homopolymers of styrene, homopolymers and copolymers of vinyl halide resins such as vinyl chloride, vinylidene chloride or vinyl esters such as vinyl acetate, vinyl acetate homopolymers and copolymers, copolymers of styrene and unsaturated acid anhydrides like maleic anhydrides, homopolymers and copolymers of acrylic and methacrylic acid and their esters and derivatives, polybutadiene, polyisoprene, butyl rubber, natural rubber, ethylene-propylene copolymers, olefinic resins like polyethylene and polypropylene, polyvinyl alcohol, carboxylated natural and synthetic latices, epoxies, epoxy esters and similar polymeric latex materials.

Latex paint compositions are well known in the art and typically comprise an emulsion, dispersion or suspension of discrete particles of resin binder and pigment in water. Optional ingredients typically include thickeners, antifoam agents, plasticizers, surfactants, coalescing agents, and the like.

Preferably, the polymer is used in acrylic based latex paints (i.e., the binder is an acrylic polymer).

The present invention is further illustrated by the following examples. All parts and percentages in the examples as well as in the specification and claims are by weight unless otherwise specified.

EXAMPLE I

The following Example is presented to show the preparation of a preferred polymer of the present invention by the preferred pre-emulsion polymerization technique.

A polymerization reactor is charged with 291 grams (gms.) of deionized water and 24 gms. of AEROSOL A-102 TM (31% by weight active solids) emulsifier. The contents of the reactor are then purged for a period of 20 minutes by passing nitrogen gas therethrough at a medium flow rate (e.g., 10 milliliters per minute) to remove dissolved oxygen while the temperature is gradually raised from room temperature to a temperature of 70° C.

A holding tank above the polymerization reactor is charged with 291 gms. of deionized water, 100 gms. vinyl acetate, 75.0 gms. methyl methacrylate, and 75.0 gms. methacrylic acid, and similarly purged for a period of 20 minutes with nitrogen gas in order to remove dissolved oxygen. A pre-emulsion of the monomers is provided by adding 21.9 gms. of AEROSOL A-102 TM emulsifier and rapidly stirring the resulting mixture.

When the temperature of the contents of the polymerization reactor reaches 70° C., 0.4 gm. of ammonium persulfate catalyst is added thereto and the contents stirred so as to dissolve the ammonium persulfate therein.

10% by weight of the pre-emulsion is then added to the polymerization reactor. The contents of the reactor are continuously agitated during the entire polymerization reaction in a manner sufficient to prevent solid coagulation or gelation of the reaction medium.

An inert gas atmosphere is maintained over the entire system during polymerization by passing a minimal flow (e.g., 0.5-1 ml/min.) of nitrogen gas through the polymerization reactor and holding tank.

The polymerization reaction is allowed to continue for 15 minutes. The remaining pre-emulsion is then continuously added to the reactor over a period of one hour and 45 minutes while maintaining the contents of the reactor at 70° C. with continued stirring. After completion of addition of the pre-emulsion the reactor temperature is then raised to 80° C. for one hour. The total reaction time is three hours.

Upon completion of the reaction, the emulsion product is cooled to 30° C., passed through a very fine (e.g., 200 mesh) stainless steel screen to collect solid coagulum (i.e., 0.08% by weight of the total monomers charged). A 10 gram sample of the filtrate is then dried in a vacuum oven for 24 hours at 80° C. to determine the % polymer solids content according to the equation:

$$\% \text{ solids} = \frac{\text{wt. of vacuum dried residue}}{\text{weight of original emulsion sample}} \times 100$$

The % solids is found to be 30.0% by weight based on the weight of the emulsion including polymer.

The % monomer conversion is then determined in accordance with the following equation:

$$\% \text{ conversion} = \frac{(\text{Total emulsion wt.} \times \% \text{ solids}) \pm \text{ solid coagulum wt.} - \text{emulsion wt.}}{\text{Total monomer wt. used}} \times 100$$

The % monomer conversion is found to be 98.0% by weight. The weight ratio of the monomers charged to the polymerization reactor is 40/30/30 of vinyl acetate (VA), methyl methacrylate (MMA), and methacrylic acid (MAA), respectively.

The intrinsic viscosity of the resulting polymer is determined in accordance with the procedure previously described herein and found to be 2.8 deciliters per gram (dl/gm). The pH of the resulting emulsion is 4.5. The resulting polymer is an efficient thickener for aqueous compositions.

EXAMPLE 2

240 gms. of vinyl acetate, 180 gms. of methyl methacrylate, and 180 gms. of methacrylic acid, are added to a holding tank and purged with nitrogen gas for 15 minutes in a manner similar to that set forth in Example 1. 1500 gms. of deionized water are added to a polymerization reactor and similarly purged with nitrogen gas for 20 minutes. The temperature of the polymerization reactor is raised to 70° C. and 45 gms. of TRITON X-200 TM (28% by weight active solids) emulsifier are added and the contents vigorously agitated (about 200 rpm). The aggitation speed is then reduced to 60 rpm, and 0.6 gm. of ammonium persulfate (0.1% by weight catalyst based on the weight of total monomers to be charged) predissolved in 2 ml. of deionized water, is added to the reactor. The mixture of monomers is then continuously added over a period of two hours to the polymerization reactor, with continued agitation (60 rpm). Upon completion of the monomer addition, the temperature of the reaction vessel is then raised to 80° C. and maintained for one hour, also with agitation. The total reaction time is three hours. An inert gas atmosphere is maintained over the entire system as in Example 1. The resulting polymer emulsion is then cooled to a temperature of 30° C. and filtered through a 100 mesh stainless steel screen to collect coagulum (found to be less than 1% by weight of the total monomers charged).

A 20 gm. portion of the polymer emulsion is thereafter vacuum dried, and the % solids and % monomer conversion are determined in the same manner as described in Example 1. The % monomer conversion is found to be 98%, and the % solids (after coagulum removal) is found to be 28%. The intrinsic viscosity of the polymer is found to be 3.6 dl/gm.

The weight ratio of the monomers employed in the polymerization process is the same as in Example 1, i.e., 40VA/30MMA/30MAA. The pH of the resulting emulsion is 4.5.

EXAMPLE 3

880 gms. of deionized water are added to a polymerization reactor, purged with nitrogen in the same manner as described in Example 1 and heated to a temperature of 50° C. 29.0 gms. of TRITON X-200 TM emulsifier (28% by weight active solids) are then added to the polymerization reactor.

160 gms. of vinyl acetate, 120 gms. of methyl methacrylate, and 120 gms. of methacrylic acid are added to a holding tank together with 0.6 gm. of 1-dodecane thiol chain transfer agent and the mixture purged with nitrogen in the same manner as described in Example 1.

The temperature of the contents of the polymerization reactor is raised to 70° C. and 0.4 gm. of ammonium persulfate dissolved in 20 gms. of deionized water is added to the polymerization reactor. The combined monomers and chain transfer agent are then continuously added from the holding tank to the polymerization reactor over a period of 2.5 hours. The contents of the reactor are maintained at a temperature of 70° C. during monomer addition. At the conclusion of the monomer addition, the reaction is allowed to proceed for one hour after bringing the temperature of the polymerization reactor to 80° C. The contents of the polymerization reactor and holding tank are continuously aggitated and purged with nitrogen gas as described in Example 1.

The resulting polymer emulsion is cooled, filtered, and tested as in Example 1. The % solids content of the emulsion (not including coagulum) is 30.3% by weight. The % monomer conversion is 97.5%. The coagulum is 1.7%. The weight ratio of the monomers employed is 40VA/30MMA/30MAA. The intrinsic viscosity of the resulting polymer is 2.7 dl/gm. The pH of the resulting emulsion is 4.5.

EXAMPLES 4–31

Examples 4–31 prepare polymers by emulsion polymerization using different weight ratios of vinyl acetate, methyl methacrylate, and methacrylic acid. The method of preparation employed is the same as that of Example II. Particular process parameters are summarized in chart form at Table I. Ammonium persulfate was used as the catalyst in each run.

In Table I and Table II the columns setting forth reaction time and temperature should be interpreted as follows. After the completion of the monomer addition the polymerization reactor temperature is raised to the higher of the two temperatures shown for a period of 60 minutes. The remainder of the time shown in the column (i.e., less 60 minutes) is the time during which the monomers were continuously added to the polymerization reactor at the lower of the two temperatures shown.

TABLE I

| | | | Polymer Emulsion Preparation | | | | | | |
|---|---|---|---|---|---|---|---|---|---|
| Example No. | VA/MMA/MAA (Monomer Wt. Ratio) | Emulsifier[1] or Agent % | Total[2] Monomer Conc. % | Catalyst[3] % | Reaction Time Min. | Reaction Temp °C. | Monomer[4] Conversion % | Solids[4] % | Coagulum[5] % | I.V.[6] |
| 4. | 20/45/35 | A (1.8) | 30 | 0.1 | 210 | 70–80 | 97.8 | 30.7 | 2.2 | 2.6 |
| 5. | 20/50/30 | A (1.8) | 30 | 0.1 | 210 | 70–80 | 98.5 | 30.6 | 0.6 | 2.1 |
| 6. | 20/50/30 | T (0.9) | 30 | 0.1 | 210 | 70–80 | 96.5 | 29.9 | 7.2 | 2.4 |
| 7. | 20/60/20 | A (1.8) | 30 | 0.15 | 210 | 70–80 | 99.2 | 30.1 | 0.0 | 1.6 |
| 8. | 20/60/20 | T (7.5) | 30 | 0.15 | 210 | 70–80 | 97.6 | 29.5 | 1.3 | 1.6 |
| 9. | 40/25/35 | A (1.8) | 30 | 0.1 | 210 | 70–80 | 97.0 | 29.9 | 12.4 | 2.8 |
| 10. | 40/30/30 | A (1.8) | 30 | 0.1 | 210 | 70–80 | 99.5 | 31.0 | 0.04 | 2.9 |
| 11. | 40/30/30 | T (7.5) | 28 | 0.1 | 180 | 70–80 | 98.4 | 27.7 | 0.8 | 3.6 |
| 12. | 40/40/20 | A (1.8) | 30 | 0.1 | 210 | 70–80 | 95.0 | 28.0 | 0.0 | 1.6 |
| 13. | 40/40/20 | T (7.5) | 30 | 0.1 | 210 | 70–80 | 97.0 | 29.5 | 0.64 | 2.5 |
| 14. | 60/5/35 | A (1.8) | 30 | 0.1 | 210 | 70–80 | 95.0 | 29.6 | 0.0 | N/D |
| 15. | 60/10/30 | A (1.8) | 30 | 0.1 | 210 | 70–80 | 97 | 30.8 | 0.9 | 2.6 |
| 16. | 60/10/30 | T (0.9) | 30 | 0.1 | 210 | 70–80 | 96 | 28.4 | 6.4 | 2.5 |
| 17. | 60/20/20 | A (1.8) | 31 | 0.1 | 180 | 70–80 | 95 | 29 | 0.1 | 2.1 |
| 18. | 60/20/20 | T (7.5) | 30 | 0.1 | 210 | 70–80 | 96 | 28.7 | 0.4 | 2.7 |
| 19. | 55/20/25 | T (7.5) | 30 | 0.1 | 180 | 70–80 | 99 | 30.2 | 1.3 | 2.2 |
| 20. | 65/10/25 | T (7.5) | 30 | 0.1 | 180 | 70–80 | 95 | 28.6 | 2.2 | 2.1 |
| 21. | 50/30/20 | A (1.8) | 31 | 0.1 | 180 | 70–80 | 99 | 30 | 0.0 | 2.4 |
| 22. | 70/5/25 | A (2.0) | 30 | 0.2 | 240 | 70–80 | 94.0 | 29.5 | 0.0 | N/D |
| 23. | 70/15/15 | A (2.0) | 30 | 0.2 | 240 | 70–80 | 96.5 | 30.4 | 0.1 | N/D |
| 24. | 30/30/40 | T (2.5) SLS (1.25) | 25 | 0.05 | 120 | 70–90 | 90 | 24.2 | 2.0 | 3.7 |
| 25. | 30/50/20 | A (1.8) | 35 | 0.1 | 150 | 70–80 | 94 | 34 | 0.14 | 2.0 |
| 26. | 40/32.5/27.5 | T (7.5) | 30 | 0.1 | 180 | 70–80 | 96 | 29 | 0.7 | N/D |
| 27. | 45/30/25 | T (7.5) | 30 | 0.1 | 180 | 70–80 | 99.6 | 30 | 0.75 | 3.1 |
| 28. | 40/35/25 | T (7.5) | 30 | 0.1 | 180 | 70–80 | 97.5 | 29 | 0.92 | 3.7 |
| 29. | 35/40/25 | T (7.5) | 30 | 0.1 | 180 | 70–80 | 97.2 | 29.2 | 1.2 | 3.5 |
| 30. | 25/50/25 | T (7.5) | 30 | 0.1 | 180 | 70–80 | 98 | 30 | 2.0 | 2.5 |
| 31. | 5/65/30 | A (2.0) | 30 | 0.1 | 210 | 70–80 | 97.7 | 30.7 | 0.9 | 2.1 |

VA = Vinyl Acetate,
MMA = Methyl Methacrylate,
MAA = Methacrylic Acid
T = TRITON X-200 ® (28% active solids)
A = AEROSOL A-102 ® (31% active solids)
N/D = Not Determined
SLS = Sodium Laural Sulfate
[1]% by weight based on weight of total water in polymerization reactor.
[2]% by weight based on weight of monomers and water.
[3]% by weight based on weight of total monomers charged.
[4]Determined in accordance with procedures set forth in Example 1.
[5]% by weight based on weight of total monomers charged.
[6]Intrinsic Viscosity determined in accordance with the procedures heretoforth discussed.

COMPARATIVE EXAMPLES 1–7

These comparative examples are presented to show the preparation of copolymers and terpolymers by emulsion polymerization from monomers which yield polymers that are not within the scope of the subject invention.

These polymers fall into at least one of the following categories.

(1) Copolymers prepared from the preferred methyl methacrylate, and methacrylic acid monomers but excluding the vinyl ester monomer such as vinyl acetate.

(2) Copolymers prepared from methacrylic acid and monomers other than vinyl esters.

The specific process parameters employed in the emulsion polymerization and other properties of interest are summarized at Table II. The emulsion polymerization technique used to prepare the polymers is the same as that employed in either Example 1 or 2 as indicated in Table II, as Ref. Ex. No.

EXAMPLE 33

This Example is presented to demonstrate the utility of the preferred polymer of the present invention as a thickener for water and to illustrate the effect on viscosity of variations in polymer concentration and pH.

Accordingly, 3 sets of samples of a polymer emulsion are prepared in accordance with the method of Example 1 having a % solids (i.e., after coagulum removal) of 30% by weight based on the weight of the emulsion including polymer. Each set of samples is diluted to a solids content of 1, 2 and 3% by weight respectively, based on the weight of the water and polymer, by adding an appropriate amount of the polymer emulsion to an appropriate amount of water. The water which is

TABLE II

COMPARATIVE POLYMER EMULSION PREPARATION

| Comparative Ex. No. | Monomer Weight Ratio | Ref. Ex. No. | Emul-[1] sifier or Agent % | Total[2] Monomer Conc. % | Catalyst[3] % | Reaction Time Min. | Reaction Temp °C. | Monomer[4] Conversion % | Solids[4] % | Coagulum[5] % |
|---|---|---|---|---|---|---|---|---|---|---|
| 1 | 80ST/20MAA | 2 | T(4.0) SLS(1.0) | 30.0 | AIBN (0.18) | 180 | 80 | 94.1 | 29.0 | 3.9 |
| 2 | 60ST/40MAA | 2 | T(4.0) SLS (1.0) | 30.0 | AIBN (0.02) | 180 | 80 | 92.3 | 29.6 | 1.44 |
| 3 | 75ST/25MAA | 1 | T(2.0) SLS (1.0) | 30.0 | AIBN (0.2) | 180 | 80 | 93.0 | 30.1 | 1.5 |
| 4 | 60MMA/40MAA | 2 | T(4.0) SLS (1.0) | 30.0 | APS (0.1) | 210 | 70–80 | 97.6 | 31.0 | 3.1 |
| 5 | 70MMA/30MAA | 2 | T(4.0) SLS (1.0) | 25.0 | APS (0.05) | 180 | 70–80 | 95.0 | 25.6 | None |
| 6 | 65MMA/35MAA | 2 | T(4.0) SLS (1.0) | 25.0 | APS (0.05) | 180 | 70–80 | 96.0 | 26.0 | None |
| 7 | 65MA/35MAA | 2 | T(4.0) SLS (1.0) | 25.0 | APS (0.1) | 120 | 75–95 | 98.0 | 26.1 | 2.8 |

[1]% by weight based on the weight of total water in polymerization reactor.
[2]% by weight based on weight of monomers and water.
[3]% by weight based on the weight of total monomers charged.
[4]% Determined in accordance with procedures set forth in Example 1.
[5]% by weight based on weight of total monomers charged.
ST = Styrene
MAA = Methacrylic Acid
MMA = Methyl Methacrylate
MA = Methylacrylate
SLS = Sodium Laural Sulfate
AIBN = Azo bisisobutylnitrile
APS = Ammonium Persulfate
T = TRITON X-200® (28% active solids)

EXAMPLE 32

This example is presented to show the conversion of the emulsified polymer prepared in accordance with Example 1 to a sodium salt and subsequent addition and solubilization of the salt in water.

60 gms. of polymer emulsion prepared in accordance with the procedures of Example I but having a % solids of 28.6% (after coagulum removal) based on the weight of the emulsion including polymer are added to a beaker and slowly neutralized by the addition of a caustic solution which is prepared from 3.7 gms. of solid sodium hydroxide dissolved in 10 gms. of water. The mixture becomes instantaneously a very thick gel slurry which is thereafter dried in a vacuum oven at 60° C. for 16 hours. The resulting solid salt is pulverized in a Wiley mill and then passed through a 20 mesh screen. 2.0 gms. of the solid powder are then placed in 100 ml. of water and stirred in a Waring blender for 15 minutes at 20 volts until it dissolves completely. The pH of the resulting polymer solution is 9.0. The viscosity of the resulting polymer solution (Brookfield Model RVF viscometer at 50 rpm) is 1600 cps.

added to each sample within each set is previously adjusted to a different pH level with ammonium hydroxide.

The pH of each diluted sample is measured on a Photovolt Model 115A pH meter and the viscosity of each sample is determined in centipoise (cps) using a Brookfield model RVF at 50 rpm. The results are summarized at Table III and the viscosity of each sample is plotted as a function of pH in the figure for the three different concentrations employed.

TABLE III

| 1% | | 2% | | 3% | |
|---|---|---|---|---|---|
| pH | Viscosity | pH | Viscosity | pH | Viscosity |
| 4.5 | 4 | 4.5 | 6 | 4.5 | 8 |
| 7.0 | 40 | 6.4 | 20 | 6.6 | 400 |
| 8.6 | 480 | 6.7 | 620 | 6.8 | 2920 |
| 9.4 | 500 | 6.9 | 1100 | 9.2 | 4800 |
| 10.0 | 400 | 9.0 | 1600 | 10.0 | 4400 |
| 10.3 | 380 | 9.7 | 1380 | 10.2 | 3280 |
| 10.8 | 180 | 10.3 | 1320 | 10.5 | 3000 |
| 11.0 | 140 | 11.0 | 1140 | 11.0 | 1600 |

As may be seen from the figure, the subject polymer is an efficient thickener for water. Thickening of the samples begins to occur at a pH of between about 6.2 and 7.0 depending on the polymer concentration. The subject polymer exhibits its greatest thickening effect at a pH between about 8.0 and 10.0 with a maximum thickening effect occurring at a pH of about 9. Thus, the thickening efficiency of the polymer is at its highest within the 8 to 10 pH range.

The figure also illustrates that the thickening efficiency of the polymer is substantially increased as the concentration of the polymer is increased.

EXAMPLE 34

This Example is presented to demonstrate the utility of the preferred polymer, which is prepared in accordance with the procedure of Example 1, as a thickener for latex paints, more particularly an interior gloss acrylic latex paint.

Accordingly, three different interior gloss acrylic latex paint formulations are prepared, namely, formulations 1, 2 and 3. Each formulation is factored to yield 2 quart batches.

Paint formulation 1 is prepared by mixing the ingredients listed at Table IV in the order in which they appear. The ingredients are mixed using a 1 horse power (hp) high speed disperser equipped with a 2 and ¼ inch disperser blade.

Thus, anti-freeze agent, surfactant, anti-foam agent and pigment are mixed at high speed (i.e., 5400 rpm for 15 minutes) in the amounts identified in formulation 1 of Table IV to form a pigment paste.

The acrylic emulsion binder and remaining additives are then mixed in order with the pigment paste until a uniform latex paint is obtained. The thickener employed in formulation 1 is added as an emulsion of the polymer which is prepared in accordance with the procedure of Example 1 having a % solids (after coagulum removal) of 30% by weight, based on the weight of the emulsion including polymer.

Formulation 2 is prepared in the same manner as formulation 1, except that a medium viscosity grade hydroxyethyl cellulose (HEC) identified by the trade name CELLOSIZE QP-4400, is employed as the thickener in place of the polymer thickener employed in formulation 1.

The hydroxyethyl cellulose is added to formulation 2 as a solution thereof in water wherein the hydroxyethyl cellulose is present in solution at a concentration of 2.5% by weight based on the weight of the solution. The 2.5% hydroxyethyl cellulose solution is added to paint formulation 2 in an amount sufficient to substitute for the polymer emulsion solids on a pound-for-pound solids basis. Water is added to formulation 2 in an amount sufficient to yield a paint formulation having a weight equal to the weight of formulation 1. This paint formulation is used for purposes of comparison of certain tested properties with the properties of formulation 1.

Formulation 3 is prepared in the same manner as formulation 1 except that no thickener is employed. Formulation 3 serves as a blank control.

The final pH of formulations 1, 2 and 3 are within the range of 8.6 to 8.8.

The properties of the paint formulations 1, 2 and 3 are analyzed in accordance with a number of different test procedures as follows:

(1) Stormer Viscosity is measured in Kreb Units (KU) with a Stormer Viscometer in accordance with ASTM D562.

(2) An ICI Cone and Plate Viscometer is used to determine the viscosity of the paint formulation in poise under a high shear rate of 10,000 sec.$^{-1}$.

(3) Gloss is measured according to ASTM D523 at 60° on a drawdown of the formulation employing the subject polymer thickener (i.e., formulation 1) and of the formulation employing H.E.C. as a control thickener (i.e., formulation 2) which serves as a basis for comparison. The drawdowns of formulations 1 and 2 are made using an applicator blade laying down a 0.003 inch thick wet film side by side on a sealed paper chart at substantially the same time. Each wet drawdown is allowed to air dry for 24 hours before gloss measurements are taken.

(4) General film appearance is examined from the same drawdown employed in the gloss measurement.

(5) Leveling is judged by brushing out each paint formulation at a spreading rate of 400 ft$^2$/gallon on a sealed chart with a polyester fiber brush. The resulting brushouts are allowed to air dry and are compared and rated on a scale of 0 to 10, with 10 indicating perfect leveling and 0 indicating no leveling. A rating of 5 (moderate leveling) is assigned to the hydroxyethyl cellulose containing paint formulation (i.e., formulation 2).

(6) Stability is tested by allowing a sample of each paint formulation to sit for 1 month at room temperature (e.g., 70° F.). Another sample of the same formulation is placed in an oven at 120° F. for 1 month. At the end of the aging periods, each sample is checked for localized gellation, excessive viscosity increase, flocculation and other signs of instability.

Localized gelation is tested as follows:

The sample is stirred with a wooden tongue depressor for a short time (e.g., 5 minutes) and the tongue depressor is then removed from the sample. The flow of the paint as it drops from the tongue depressor is observed. If the flow is uniform, the stability is determined to be good. If localized gellation occurs, e.g., the paint flow is uneven and the formulation contains lumps which drop off unevenly, the stability of the formulation is determined to be no good.

The results from testing paint formulations 1, 2 and 3 in accordance with the testing procedures 1 to 6 outlined above are summarized in chart form at Table V.

As may be seen from the data presented therein the subject polymer is an effective paint thickener yielding a formulation having excellent paint properties comparable to those of the formulation employing hydroxyethyl cellulose as the thickener.

TABLE IV

| | INTERIOR GLOSS ACRYLIC LATEX PAINT | | | | |
|---|---|---|---|---|---|
| FORMULATION NO. | | | 1 | 2 | 3 |
| Ingredient | Generic Name | Manufacturer | | Pounds | |
| Propylene Glycol | Propylene Glycol (anti-freeze agent) | Union Carbide Corporation | 59.8 | 59.8 | 59.8 |
| TAMOL 731 (25%) | Sodium Salt of Polymeric Carboxylic | Rohm & Haas Company | 10.8 | 10.8 | 10.8 |

TABLE IV-continued
INTERIOR GLOSS ACRYLIC LATEX PAINT

| FORMULATION NO. | | | 1 | 2 | 3 |
|---|---|---|---|---|---|
| Ingredient | Generic Name | Manufacturer | Pounds | | |
| NOPCO NDW | Acid (surfactant) Collodial Anti-foam (anti-foam agent) | Diamond Shamrock Chemical Company | 2.0 | 2.0 | 2.0 |
| TITANOX 2020 | Rutile Titanium Dioxide (pigment) | NL Industries, Inc. | 269.6 | 269.6 | 269.6 |
| GRIND AT HIGH SPEED - 5400 RPM - FIFTEEN MINUTES | | | | | |
| Add with Mixing | | | | | |
| Propylene Glycol | | Union Carbide Corporation | 57.8 | 57.8 | 57.8 |
| RHOPLEX AC-490 | Acrylic Emulsion (46.5% solids) (gloss grade) | Rohn & Haas Company | 555.9 | 555.9 | 555.9 |
| SUPER-AD-IT | Diphenyl mercury dodecenyl succinate (preservative) | Tenneco Chemical, Inc. | 1.0 | 1.0 | 1.0 |
| TEXANOL | Ester-Alcohol | Eastman Kodak Company | 15.7 | 15.7 | 15.7 |
| TRITON GR-7M | Dioctyl sodium sulfosuccinate | Rohm & Haas Company | 2.0 | 2.0 | 2.0 |
| NOPCO NDW | Colloidal Anti-foam (anti-foam agent) | Diamond Shamrock Chemical Company | 2.9 | 2.9 | 2.9 |
| Water | | | 95.6 | 22.3 | 102.3 |
| Thickener | Polymer Emulsion from Example 1 (30% solids) | | 6.7 | — | — |
| | H.E.C. 2.5% solution | | — | 80.0 | — |
| | | TOTAL | 1079.8 | 1079.8 | 1079.8 |

EXAMPLE 35

Example 34 is repeated with the exception that the polymer emulsion thickener employed in formulation 1 of Example 34 is prepared in accordance with Example 2. Thus, 7.1 lbs of the polymer emulsion of Example 2 having a % solids of 28% (i.e., after coagulum removal) by weight, based on the weight of the emulsion including polymer, and 95.2 lbs. of water are used in preparing formulation 1 of this example. The adjustment in the amount of polymer emulsion and water added to paint formulation 1 maintains the polymer thickener solids content of the paint formulation at 2.0 lbs./100 gallons of formulation, and keeps the batch size, by weight, constant.

Formulation 2 is prepared as described in Example 34. No blank control is employed in this Example. Thus, a third formulation is not prepared.

The properties of paint formulations 1 and 2 of this Example are tested in accordance with the procedures outlined in Example 34 and the results are summarized at Table V.

As may be seen from Table V, the thickening efficiency of the polymer employed in Example 35, formulation 1 is comparable to the thickening efficiency of the polymer thickener prepared in accordance with Example 34, formulation 1, as are the properties of the formulation into which the polymer emulsion of this Example is incorporated.

Formulation 1 of this Example also possesses properties which are comparable to those of formulation 2 of this Example which employs hydroxyethyl cellulose as the thickener.

EXAMPLE 36

Example 34 is repeated with the exception that the polymer emulsion thickener employed in formulation 1 of Example 34 is prepared in accordance with the procedures of Example 3.

Thus, 6.0 lbs. of the polymer emulsion of Example 3 having a % solids of 30.3% (after coagulum removal) by weight, based on the weight of the emulsion including polymer, and 96.3 lbs. of water are used in preparing formulation 1 of this Example. The adjustment in the amount of polymer emulsion and water added to paint formulation 1 maintains the polymer thickener solids content at 2.0 lbs/100 gallons of formulation, and keeps the batch size, by weight, constant.

Formulation 2 is prepared as described in Example 34. No blank control is prepared.

The properties of paint formulations 1 and 2 of this Example are tested in accordance with the procedures of Example 34 and the results are summarized at Table V.

As may be seen from the data of Table V, the results of this example are comparable to the results of Example 34.

EXAMPLE 37

Example 34 is repeated with the following exceptions. Two formulations are prepared in accordance with formulation 1 of Example 34. Formulation 1 of this Example employs the polymer emulsion used to make the sodium polymer salt of Example 32 as the thickener. Formulation 3 of this Example employs the sodium polymer salt itself in powder form as the thickener.

Accordingly, 7.0 lbs. of the polymer emulsion from which the salt was made in Example 32, having a % solids of 28.6%, (after coagulum removal) by weight, based on the weight of the emulsion including polymer, and 95.3 lbs. of water are used in preparing formulation 1 of this Example. The adjustment in the amount of polymer emulsion and water added to the formulation 1 maintains the polymer thickener solids content at 2.0 lbs/100 gallons of formulation and keeps the batch size, by weight, constant.

Formulation 2 is prepared as described in formulation 2 of Example 34. No blank control is prepared.

As described above, formulation 3 is prepared in accordance with the procedures outlined in Example 34 for formulation 1 with the exception that the polymer thickener employed is the polymer salt prepared in accordance with Example 32. The amount of the polymer salt and water added in this formulation is sufficient to obtain a polymer thickener solids content of 2.0 lbs/100 gallons of formulation and to keep the total batch size, by weight, constant.

The paint properties of paint formulations 1, 2 and 3 of this Example are tested in accordance with the procedures of Example 34 and the results are summarized at Table V.

As may be seen from the data of Table V the results of this Example are comparable to the results of Example 34 and indicate that the subject polymer is an effective thickener in paint formulations whether employed in emulsified or salt form.

content of 2.0 lbs./100 gallons of formulation and to maintain the total weight of 100 gallons of the paint formulation at 1079.8 lbs. The pH of the resulting formulations of runs 3 to 30 is between 8.6 and 8.8.

Each paint formulation is tested in accordance with the procedures of Example 34 with the exception of stability. The stability of the resulting formulations of this Example is tested in accordance with the following procedure. A sample of each formulation is placed in an oven maintained at 120° F. for one month. At the end of this time the Stormer Viscosity of each sample is tested and the physical appearance of each sample is checked for localized gelation. The degree of gelation is rated as none, very slight, slight, moderate and excessive. The purpose of the oven treatment is to simulate a shelf time of six months to one year. Since each sample tested in accordance with this procedure is subjected to elevated temperature, this test is referred to as a heat stability test.

The test results are summarized at Table VI as runs 3 to 30. The monomer weight ratios, from which the polymer thickener employed in each run is prepared, is identified at Column 3. The procedure employed to

TABLE V

PROPERTIES OF INTERIOR GLOSS ACRYLIC LATEX PAINT FORMULATIONS

| Example No. | Formulation No. | Thickener | Viscosity Stormer[1] KU | Viscosity ICI Cone[2] & Plate | Gloss 60° | Leveling | Film Appearance | Stability 1 month 70° F. | Stability 1 month 120° F. |
|---|---|---|---|---|---|---|---|---|---|
| 34 | 1 | 40VA/30MMA/30MAA (Ex. 1) | 89 | 0.9 | 79 | 5 | Smooth | Good | Good |
|  | 2 | H.E.C. | 89 | 1.1 | 76 | 5 | Smooth | Good | Good |
|  | 3 | None | 61 | 0.3 | ND | ND | ND | ND | ND |
| 35 | 1 | 40VA/30MMA/30MAA (Ex. 2) | 84 | 1.0 | 65 | 5+ | Smooth | Good | Good |
|  | 2 | H.E.C. | 83 | 1.0 | 62 | 5 | Smooth | Good | Good |
| 36 | 1 | 40VA/30MMA/30MAA (Ex. 3) | 91 | 1.1 | 80 | 5 | Smooth | ND | ND |
|  |  | H.E.C. | 88 | 1.2 | 74 | 5 | Smooth | ND | ND |
| 37 | 1 | 40VA/30MMA/30MAA (Ex. 33) | 85 | 0.8 | 69 | 6 | Smooth | Good | Good |
|  | 2 | H.E.C. | 89 | 1.1 | 69 | 5 | Smooth | Good | Good |
|  | 3 | Na salt of formulation 1 | 85 | 0.9 | 68 | 6 | Smooth | Good | Good |

[1]KU = Kreb Units
[2]Units in Poise at 10,000 Sec.$^{-1}$
VA = *Vinyl Acetate*
MMA = *Methyl Methacrylate*
MAA = *Methacrylic Acid*
ND = *Not Determined*

EXAMPLE 38

Example 34 is repeated for runs 3 to 30 with the exception that the polymer emulsion employed in formulation 1 of Example 34 for each run 3 to 30 is prepared in accordance with the procedures of Examples 4 to 31.

Thus, formulation 1 of Example 34 serves as a standard formulation into which the polymer emulsion thickeners of Examples 4 to 31 are added. The amount of polymer emulsion and water added to the formulation are adjusted to give a polymer thickener solids prepare each of the polymer emulsions employed in the formulations of runs 3 to 30 can be determined from the Reference Example Number identified at Column 2 which refers back to Examples 4 to 31.

A paint formulation prepared in accordance with formulation 2 of Example 34 using hydroxyethyl cellulose (H.E.C.) as the thickener is also tested and the results are summarized at Table VI as run 1. This formulaton is provided for comparative purposes. A blank control prepared in accordance with Example 34 formulation 3 is also tested and the results are summarized as run 2.

TABLE VI
PROPERTIES OF INTERIOR GLOSS ACRYLIC LATEX PAINT FORMULATIONS EMPLOYING POLYMER EMULSION THICKENERS

| Column No. 1 | 2 | 3 | 4 | 5 | 6 | 7 | 8 | 9 | 10 |
|---|---|---|---|---|---|---|---|---|---|
| | | | Viscosity | | | | | Heat Stability | |
| Run No. | Reference Ex. No. | Thickener | Stormer[1] KU | ICI Cone[2] & Plate | Level-ing | Gloss 60° | Film Appearance | Stormer Viscosity KU | Localized Gelation |
| 1 | 35 (Form. 2) | H.E.C. | 84 | 1.0 | 5 | 59-60 | Smooth | 101 | None |
| 2 | 35 (Form. 3) | none | 61 | 0.3 | ND | ND | Smooth | ND | ND |
| 3 | 4 | 20VA/45MMA/35MAA | 82 | 1.2 | 5 | 62 | Smooth | 89 | Slight |
| 4 | 5 | 20VA/50MMA/30MMA | 79 | 1.2 | 5 | 65 | Smooth | 89 | None |
| 5 | 6 | 20VA/50MMA/30MAA | 82 | 1.2 | 5+ | 60 | Smooth | ND | Excessive |
| 6 | 7 | 20VA/60MMA/20MAA | 74 | 1.1 | 5+ | 60 | Smooth | 82 | None |
| 7 | 8 | 20VA/60MMA/20MAA | 76 | 1.2 | 5+ | 59 | Smooth | ND | Excessive |
| 8 | 9 | 40VA/25MMA/35MAA | 89 | 1.3 | 5 | 62 | Smooth | 93 | Slight |
| 9 | 10 | 40VA/30MMA/30MAA | 88 | 1.3 | 4+ | 64 | Smooth | 93 | Slight |
| 10 | 11 | 40VA/30MMA/30MAA | 94 | 0.8 | 5+ | 64 | Smooth | 99 | Slight |
| 11 | 12 | 40VA/40MMA/20MAA | 78 | 1.2 | 5+ | 60 | Smooth | 86 | None |
| 12 | 13 | 40VA/40MMA/20MAA | 83 | 1.2 | 5 | 60 | Smooth | ND | Excessive |
| 13 | 14 | 60VA/5MMA/35MAA | 71 | 1.2 | 6 | 55 | Smooth | 82 | None |
| 1 | 35 (Form. 2) | H.E.C. | 84 | 1.0 | 5 | 59-60 | Smooth | 101 | None |
| 14 | 15 | 60VA/10MMA/30MAA | 84 | 1.2 | 5 | 62 | Smooth | 88 | None |
| 15 | 16 | 60VA/10MMA/30MAA | 85 | 1.2 | 5 | 62 | Smooth | 86 | None |
| 16 | 17 | 60VA/20MMA/20MAA | 81 | 1.2 | 5+ | 61 | Smooth | 89 | None |
| 17 | 18 | 60VA/20MMA/20MAA | 85 | 1.3 | 5 | 58 | Smooth | ND | Excessive |
| 18 | 19 | 55VA/20MMA/25MAA | 78 | 0.7 | 5+ | 61 | Smooth | 78 | Very Slight |
| 19 | 20 | 65VA/10MMA/25MAA | 78 | 0.6 | 6− | 59 | Smooth | 75 | None |
| 20 | 21 | 50VA/30MMA/20MAA | 84 | 0.6 | 5+ | 58 | Smooth | 78 | None |
| 21 | 22 | 70VA/5MMA/25MAA | 79 | 0.7 | 7+ | 66 | Smooth | 79 | None |
| 22 | 23 | 70VA/15MMA/15MAA | 78 | 0.7 | 5+ | 70 | Smooth | 89 | None |
| 23 | 24 | 30VA/30MMA/40MAA | 84 | 0.8 | 6 | 61 | Smooth | 92 | Excessive |
| 1 | 35 (Form. 2) | H.E.C. | 84 | 1.0 | 5 | 59-60 | Smooth | 101 | None |
| 24 | 25 | 30VA/50MMA/20MAA | 70 | 0.5 | 7+ | 68 | Smooth | 83 | Moderate |
| 25 | 26 | 40VA/32.5MMA/27.5MAA | 81 | 0.7 | 5+ | 66 | Smooth | 86 | None |
| 26 | 27 | 45VA/30MMA/25MAA | 79 | 0.6 | 6+ | 63 | Smooth | 84 | None |
| 27 | 28 | 40VA/35MMA/26MAA | 75 | 0.5 | ND | 63 | Smooth | 81 | None |
| 28 | 29 | 35MA/40MMA/25MAA | 79 | 0.6 | 6 | 64 | Smooth | 81 | None |
| 29 | 30 | 25VA/50MMA/25MAA | 71 | 0.5 | ND | 62 | Smooth | 78 | None |
| 30 | 31 | 5VA/65MMA/30MAA | 78 | 0.8 | 6+ | 65 | Smooth | 86 | None |

[1]KU = Kreb Units
[2]Units in Poise at 10,000 Sec.$^{-1}$
ND = Not Determined
Form. = Formulation

COMPARATIVE EXAMPLE 8

Example 34 is repeated with respect to formulation 1 with the exception that the polymer thickener is selected from the polymers employed in Comparative Examples 1 to 7.

Thus, formulation 1 of Example 34 serves as a standard acrylic latex paint formulation into which each of the polymer emulsions prepared in accordance with Comparative Examples 1 to 7 are incorporated. Each paint formulation is identified by a run number at Table VII.

The amount of polymer emulsion and water employed in each formulation is adjusted to obtain a polymer thickener solids content in the final formulation of 2.0 lbs./100 gals. of formulation and to maintain the total weight of 100 gals. of each formulation at 1079.8 lbs.

The properties of each of the resulting paint formulations are tested in accordance with the test procedures of Example 34 with the exception of stability which is substituted by the heat stability test of Example 38.

The pH of all the resulting paint formulations of runs 1 to 7 is between 8.6 and 8.8.

The test results are summarized in chart form at Table VII as runs 1 to 7. The identity and weight ratio of the monomers from which each polymer thickener of each run is prepared are given at Column 3 of Table VII. The method of preparation of each polymer thickener emulsion can be determined from the Comparative Reference Example Number given at Column 2 of Table VII which refers back to Comparative Examples 1 to 7.

TABLE VII
PROPERTIES OF INTERIOR GLOSS ACRYLIC LATEX PAINT FORMULATIONS EMPLOYING COMPARATIVE POLYMER EMULSION THICKENERS

| 1 | 2 | 3 | 4 | 5 | 6 | 7 | 8 | 9 | 10 | 11 |
|---|---|---|---|---|---|---|---|---|---|---|
| | | | | | | Gloss 60° | | | Heat Stability | |
| Run No. | Comparative Reference Ex. No. | Thickener | Viscosity Stormer[1] KU | ICI Cone[2] & Plate | Level-ing | Formulation Test Sample | HEC Control | Film Appearance | Stormer Viscosity KU | Localized Gelation |
| 1 | 6 | 65MMA/35MAA | 69 | 0.7 | 9 | 78 | 75 | Smooth | 86 | None |

TABLE VII-continued
PROPERTIES OF INTERIOR GLOSS ACRYLIC LATEX PAINT FORMULATIONS EMPLOYING COMPARATIVE POLYMER EMULSION THICKENERS

| 1 | 2 | 3 | 4 | 5 | 6 | 7 | 8 | 9 | 10 | 11 |
|---|---|---|---|---|---|---|---|---|---|---|
| | | | | | | Gloss | | | Heat Stability | |
| Run No. | Comparative Reference Ex. No. | Thickener | Viscosity Stormer[1] KU | ICI Cone[2] & Plate | Leveling | 60° Formulation Test Sample | HEC Control | Film Appearance | Stormer Viscosity KU | Localized Gelation |
| 2 | 5 | 70MMA/30MAA | 71 | 0.7 | 9 | 77 | 77 | Smooth | 85 | None |
| 3 | 4 | 60MMA/40MAA | 72 | 0.8 | 8+ | 71 | 67 | Smooth | 86 | None |
| 4 | 7 | 65MA/35MAA | 69 | 0.7 | 9 | 60 | 75 | Specky | 102 | None |
| 5 | 1 | 80ST/20MAA | 68 | 0.5 | 8+ | 75 | 74 | Smooth | ND | ND |
| 6 | 2 | 60ST/40MAA | 70 | 0.6 | 9 | 36 | 70 | Smooth | 84 | None |
| 7 | 3 | 75ST/25MAA | 70 | 0.6 | 9 | 79 | 76 | Smooth | ND | ND |

[1]KU = Kreb Units
[2]Unites in poise at 10,000 sec$^{-1}$
ND = Not determined

As may be seen from the data of Tables V and VI, all of the formulations employing the identified polymer thickeners of the present invention exhibit a Stormer Viscosity higher than 61 KU which is the Stormer Viscosity of the blank control formulation wherein no thickener is employed.

Since the amount of the various polymer thickeners employed in the interior gloss acrylic latex paint formulation is the same on a solids basis, the higher the Stormer Viscosity of the formulation, the more cost effective the polymer thickener employed therein will be when the remaining paint properties are relatively the same. In short, although all of the polymers of the present invention employed in the formulation of Table IV impart a thickening effect, some polymers require higher concentrations to achieve the same thickening effect at moderate shear as determined by Stormer Viscosity.

Similar considerations apply in evaluating ICI Cone and Plate Viscosity which is the viscosity of the paint formulation at a high shear rate and indicative of the formulation behavior when subjected to the high shear force of brushing. All of the polymers of the present invention which were employed in the interior gloss acrylic latex paint formulations of Table IV exhibit ICI Cone and Plate viscosities greater than 0.3, which is the high shear viscosity of the blank formulation wherein no thickener is employed. Thus, all the polymers of the present invention impart a high shear thickening effect of varying degree.

The leveling properties of all of the paint formulations employing the polymers of the present invention are comparable to the leveling property of the formulation employing H.E.C. as a thickener.

The gloss and film appearance properties of the paint formulation employing the polymers of the present invention are also comparable to those of the paint formulation which employs H.E.C. as a thickener.

Heat stability is expressed at Table VI in terms of the Stormer Viscosity and visual appearance of the paint formulation after heat treatment. The Stormer Viscosity data after heat treatment should be evaluated in terms of the difference between the Stormer Viscosity of each paint formulation before and after the heat treatment. An increase in the Stormer Viscosity of a paint formulation of over 20 KU indicates poor heat stability which in turn indicates that the formulation will have a shorter shelf life than those paint formulations which do not exhibit such a Stormer Viscosity increase.

It will be seen from Table VI that the Stormer Viscosity increase of the paint formulations employing H.E.C. as a thickener is 17 KU and that most of the polymers of the present invention employed in the interior gloss acrylic latex paint formulation exhibit a Stormer Viscosity increase of less than 17 KU.

It will also be seen from the data of Table VI that some of the formulations employing polymers of the present invention exhibit excessive localized gelation after the heat treatment of the heat stability test. Thus, the polymer thickeners of these formulations are suitable as thickeners in paint formulations which do not require an extended shelf life.

The following examples are presented to illustrate the variety of aqueous compositions to which the polymers of the present invention can be added to obtain a thickening effect. The polymer thickener, which is employed in all of the following examples, namely, Examples 39 to 50, is the 40VA/30MMA/30MAA polymer emulsion prepared in accordance with the procedures of Example 1 having a % solids of 30% by weight, based on the weight of the emulsion including polymer.

The ingredients and amounts thereof, used to prepare each composition of Examples 39 to 50 are summarized in chart form at Tables VIII, X to XIII, and XV to XXI. Instructions for mixing the ingredients of the aqueous composition of Examples 39 to 50 are provided at their respective tables.

EXAMPLE 39

Two latex anti-corrosive maintenance primer formulations are prepared, namely, formulations 1 and 2.

Formulation 1 is prepared using the ingredients identified at Table VIII which are mixed as indicated in the order in which they appear. The thickener employed in this formulation is the polymer emulsion prepared in accordance with Example 1, having a 30% solids content. The thickener emulsion is added to the formulation in an amount sufficient to bring the polymer thickener solids content in the final formulation to 0.18% by weight of the final formulation.

Formulation 2 is prepared in the same manner as formulation 1 except that the thickener employed is hydroxyethyl cellulose (H.E.C.), which is added as an aqueous gel having H.E.C. present therein in an amount of 2.5% by gel weight. The hydroxyethyl cellulose thickener is added in an amount sufficient to bring its solids content to 0.18% by weight, based on the weight of the final formulation. Water is added in an amount sufficient to keep the batch size, by weight, constant. Formulation 2 is provided for comparative purposes.

The properties of formulations 1 and 2 are tested in accordance with the procedures of Example 34. The test results are summarized in chart form at Table IX.

As may be seen from the data of Table IX, the polymer of the present invention is an effective thickener and yields a paint formulation having acceptable paint properties which are comparable to the formulation 2 which employs H.E.C. as a thickener.

EXAMPLE 40

Two exterior flat acrylic top coat formulations are prepared, namely, formulations 1 and 2.

Formulation 1 is prepared using the ingredients identified at Table X which are mixed as indicated in the order in which they appear. The thickener employed in this formulation is the polymer emulsion prepared in accordance with Example 1, having a 30% solids content.

TABLE VII

LATEX ANTICORROSIVE MAINTENANCE PRIMER

| FORMULATION NO. | | | 1 | 2 |
|---|---|---|---|---|
| Ingredient | Generic Name | Manufacturer | Pounds | |
| *Add in the Following Order with Mixing* | | | | |
| Water | | | 60.0 | 40.0 |
| 2.5% H.E.C. Gel | | | | 20.0 |
| TAMOL 731 (25%) | Sodium Salt of Polymeric Carboxylic Acid (anionic surfactant) | Rohm & Haas Company | 9.9 | 9.9 |
| TRITON CF-10 | Alkylaryl Polyether (wetting agent-nonionic) | Rohm & Haas Company | 2.2 | 2.2 |
| NOPCO NXZ | Colloidal Anti-foam (Anti-foam agent) | Diamond Shamrock Chemical Company | 2.2 | 2.2 |
| Ethylene Glycol | Antifreeze Agent | Union Carbide Corporation | 30.0 | 30.0 |
| TITANOX 2062 | Rutile Titanium Dioxide (pigment) | NL Industries, Inc. | 150.0 | 150.0 |
| 325 MICA | Water Ground Mica (325 mesh) | English Mica | 25.0 | 25.0 |
| VICRON 15-15 | Calcium Carbonate | Charles Pfizer | 100.00 | 100.0 |
| NALZIN SC-1 | Zinc Phospho-Oxide Complex | NL Industries, Inc. | 75.0 | 75.0 |
| *GRIND AT HIGH SPEED - 5400 RPM - 15 MINUTES* | | | | |
| *Add with Mixing* | | | | |
| RHOPLEX MV-2 | Acrylic Emulsion Exterior-metal Grade (46% solids) | Rohm & Haas Company | 600.9 | 600.9 |
| TEXANOL | Ester-Alcohol (coalescing aid) | Eastman Kodak Company | 5.0 | 5.0 |
| SUPER-AD-IT | Diphenylmercury dodecenyl succinate (preservative) | Tenneco Chemical, Inc. | 2.0 | 2.0 |
| NOPCO NXZ | Colloidal Anti-foam (anti-foam agent) | Diamond Shamrock Chemical Company | 2.2 | 2.2 |
| Ammonium Hydroxide (28% by weight solution) | | | 3.0 | 3.0 |
| Water | | | 60.0 | 6.7 |
| Thickener | Polymer Emulsion from Ex. 1 | | 6.7 | — |
| | H.E.C. 2.5% Solution | | — | 60.0 |
| TOTAL | | | 1134.1 | 1134.1 |

TABLE IX

LATEX ANTI-CORROSIVE MAINTENANCE PRIMER

| FORMULATION NO. | 1 | 2 |
|---|---|---|
| Paint Property | | |
| Stormer Viscosity | 89 KU | 93 KU |
| ICI Cone and Plate Viscosity | 0.7 Poise | 0.9 Poise |
| Leveling | 6+ | 5 |
| Stability | | |
| Room Temperature (70° F.) | | |
| 1 Month | Good | Good |
| 120° F. (Oven) 1 Month | Good | Good |

Formulation 2 is prepared in the same manner as formulation 1 except that the thickener employed is hydroxyethyl cellulose (H.E.C.) which is added as an aqueous gel having the H.E.C. present therein in an amount of 2.5% by gel weight. The H.E.C. thickener is added in an amount sufficient to substitute for the polymer thickener of the present invention on an equal solids basis.

A satisfactory thickening of the latex paint is obtained, with the polymer emulsion containing paint yielding a Stormer Viscosity of 74 KU, and the hydroxyethyl cellulose paint yielding a Stormer Viscosity of 79 KU. All of the remaining tested paint properties are substantially equivalent.

TABLE X

EXTERIOR FLAT ACRYLIC TOP-COAT

| FORMULATION NO. | | | 1 | 2 |
|---|---|---|---|---|
| Ingredient | Generic Name | Manufacturer | Pounds | |
| Add in the Following Order with Mixing | | | | |
| Water | | | 85.0 | 85.0 |
| TAMOL 731 | Sodium Salt of Polymeric Carboxylic Acid (Anionic surfactant) | Rohm & Haas Company | 12.6 | 12.6 |
| TRITON CF-10 | Alkylaryl Polyether (wetting agent-nonionic) | Rohm & Haas Company | 2.5 | 2.5 |
| NOPCO NXZ | Colloidal Anti-foam (anti-foam agent) | Diamond Shamrock Chemical Company | 1.0 | 1.0 |
| Ethylene Glycol | Antifreeze Agent | Union Carbide Corporation | 25.0 | 25.0 |
| TITANOX 2062 | Rutile Titanium Dioxide chalk resistant | NL Industries, Inc. | 250.0 | 250.0 |
| NYTAL 300 | Magnesium Silicate (Talc) | Vanderbilt, R.T., Company | 205.8 | 205.8 |
| GRIND AT HIGH SPEED - 5400RPM - FIFTEEN MINUTES | | | | |
| Add with Mixing | | | | |
| RHOPLEX AC-235 | Acrylic Emulsion Exterior Grade (46% Solids) | Rohm & Haas Company | 490.8 | 490.8 |
| NOPCO NXZ | Colloidal Anti-foam (anti-foam agent) | | 1.0 | 1.0 |
| SUPER-AD-IT | Diphenyl mercury dodecenyl succinate (preservative) | Tenneco Chemical, Inc. | 9.0 | 9.0 |
| Ammonium Hydroxide (28% by weight solution) | | | 2.0 | 2.0 |
| Water | | | 93.5 | 1.8 |
| Thickener | Polymer Emulsion from Ex. 11 (30% Solids) | | 8.3 | — |
| | H.E.C. 2.5% | | — | 100.0 |
| TOTAL | | | 1186.5 | 1186.5 |

EXAMPLE 41

A high gloss acrylic latex paint is prepared using the ingredients identified at Table XI which are mixed as indicated in the order in which they appear. In this formulation, the pigment is added as a predispursed slurry. The remaining ingredients are also added as liquids, thereby requiring only simple mixing to prepare the paint. The polymer emulsion prepared in accordance with Example 1 having a 30% solids content is employed as a thickener in this formulation.

The polymer thickener employed in this formulation will provide the desired rheology and would impart a Stormer Viscosity of 85 KU, high gloss and good stability to the resulting formulation.

TABLE XI

HIGH GLOSS ACRYLIC LATEX PAINT USING PREDISPERSED PIGMENT

| Add in the Following Order with Mixing | | | |
|---|---|---|---|
| Ingredient | Generic Name | Manufacturer | Pounds |
| Propylene Glycol | Antifreeze Agent | Union Carbide Corporation | 82.0 |
| NOPCO NDW | Colloidal Anti-foam (anti-foam agent) | Diamond Shamrock Chemical Company | 2.2 |
| TAMOL 731 25% | Sodium Salt of Polymeric Carboxylic Acid (anionic surfactant) | Rohm & Haas Company | 10.2 |
| Propylene Glycol | Antifreeze Agent | Union Carbide Corporation | 25.0 |
| RHOPLEX AC-490 | Acrylic Emulsion Gloss Grade (46%) Solids | Rohm & Haas Company | 420.0 |
| BUTYL CELLOSOLVE | Ethylene glycol mono-butylether (coalescing aid) | Union Carbide Corporation | 18.8 |
| SUPER-AD-IT | Di phenyl mercury dodecenyl succinate (preservative) | Tenneco Chemical, Inc. | 0.5 |
| TRITON GR-7 | Dioctyl sodium sulfo-succinate (anionic dispersant) | Rohm & Haas Company | 2.0 |
| NOPCO NDW | Colloidal Anti-foam (anti-foam agent) | Diamond Shamrock Chemical Company | 2.0 |

TABLE XI-continued
HIGH GLOSS ACRYLIC LATEX PAINT USING PREDISPERSED PIGMENT Add in the Following Order with Mixing

| Ingredient | Generic Name | Manufacturer | Pounds |
|---|---|---|---|
| TITANOX 4101 76% | Rutile Titanium Dioxide predispersed in slurry (76% solids) | NL Industries, Inc. | 361.6 |
| Water | | | 128.8 |
| Thickener | Polymer Emulsion from Ex. 1 (30% solids) | | 10.0 |
| | TOTAL | | 1063.1 |

Adjust pH to 8.5 to 9.0 with 28% ammonium hydroxide

EXAMPLE 42

A rust inhibitive red iron oxide styrene-acrylic latex metal primer paint formulation is prepared using the ingredients identified at Table XII which are mixed as indicated in the order in which they appear. The polymer emulsion prepared in accordance with Example 1 having a solids content of 30% is employed as a thickener. This Example demonstrates the utility of the polymers of the present invention as thickeners in a styrene-acrylic base paint.

The resulting paint formulation is tested in accordance with the procedures of Example 34 and yields a Stormer Viscosity of 75 KU, good paint stability and paint film properties. When this paint formulation is applied to a phosphatized cold rolled steel panel at a dry film thickness of 2.0 mils and exposed to a salt fog in accordance with ASTM D117, excellent corrosion resistance is obtained.

TABLE XII
RUST INHIBITIVE RED IRON OXIDE PRIMER WITH STYRENE ACRYLIC LATEX METAL PRIMER

Add in the Following Order with Mixing

| Ingredient | Generic Name | Manufacturer | Pounds |
|---|---|---|---|
| Water | | | 125.0 |
| TAMOL 731 25% | Sodium Salt of Polymeric Carboxylic Acid (anionic surfactant) | Rohm & Haas Company | 16.0 |
| TRITON CF-10 | Alkylaryl Polyether (wetting agent-nonionic) | Rohm & Haas Company | 2.8 |
| NOPCO NDW | Colloidal Anti-foam (anti-foam agent) | Diamond Shamrock Chemical Company | 3.2 |
| R&R 551 | Water Dispersable Soya Lecithin | Ross & Rowe | 2.0 |
| Ethylene Glycol | Antifreeze Agent | Union Carbide Corporation | 28.0 |
| DOWICIL 75 | 1-(3-chloroalkyl)triazo-1-azoniadamantane chloride (preservative) | Dow Chemical Company | 1.0 |
| RED IRON OXIDE | Pigment | Charles Pfizer | 100.0 |
| NALZIN SC-1 | Zinc-Phospho-Oxide Complex (anticorrosive pigment) | NL Industries, Inc. | 80.0 |
| MICA 325 | Mica Water Ground | English Mica | 36.0 |
| SNOWFLAKE | Calcium Carbonate | T-W | 100.0 |
| - GRIND AT HIGH SPEED - 5400 RPM - FIFTEEN MINUTES Add with Mixing | | | |
| NOPCO NDW | Colloidal Antifoam (anti-foam agent) | Diamond Shamrock Chemical Company | 1.6 |
| AROLON X820 | Styrene-Acrylic Copolymer Resin Emulsion-metal finishing grade (49% solids) | Ashland Chemical Company | 500.0 |
| BUTYL CARBITOL | Diethylene Glycol Monobutyl Ether | Union Carbide Corporation | 7.0 |
| BUTYL CARBITOL ACETATE | Diethylene Glycol Monobutyl Ether Acetate | Union Carbide Corporation | 7.0 |
| Ammonium Hydroxide (28% by weight solution) | | | 3.2 |
| AROPLAZ 1271 | Longoil Linseed Alkyd Resin Modifier (99% Solids) | Ashland Chemical Company | 26.0 |
| TRITON CF-10 | Alkylaryl Polyether (wetting agent-nonionic) | Rohm & Haas Company | 1.4 |

TABLE XII-continued

RUST INHIBITIVE RED IRON OXIDE PRIMER WITH STYRENE ACRYLIC LATEX METAL PRIMER

Add in the Following Order with Mixing

| Ingredient | Generic Name | Manufacturer | Pounds |
|---|---|---|---|
| Water | | | 17.9 |
| Thickener | Polymer Emulsion from Ex. 1 (30% Solids) | | 11.7 |
| | | TOTAL | 1069.8 |

EXAMPLE 43

Two interior vinyl-acrylic flat latex paint formulations are prepared, namely, formulations 1 and 2.

Formulation 1 is prepared using the ingredients identified at Table XIII which are mixed as indicated in the order in which they appear. The thickener employed in this formulation is the polymer emulsion prepared in accordance with Example 1 having a 30% solids content.

Formulation 2 is prepared in the same manner as formulation 1 except that hydroxyethyl cellulose is employed as the thickener and is added and dispersed in the initial grind step as a powder. The properties of formulations 1 and 2 of this Example are tested in accordance with the procedures of Example 34 and the results summarized in Table XIV. An additional test is also performed for freeze/thaw stability.

Freeze/thaw stability is determined by submitting a pint of each test sample to sub-freezing temperatures (10° to 12° F.) for 17 to 18 hours, followed by a 3-6 hour thawing period at room temperature and subsequent examination of the test paint. This cycle is repeated five times.

As may be seen from the data presented at Table XIV, the polymer emulsion of the present invention acts as an efficient thickener. However, the freeze/thaw stability of formulation 1 is poorer than that of formulation 2 employing hydroxyethyl cellulose as a thickener. The remaining paint properties of formulation 1 are comparable to formulation 2.

TABLE XIII

LATEX ANTICORROSIVE MAINTANENCE PRIMER

| | | | FORMULATION NO. 1 | 2 |
|---|---|---|---|---|
| | Add in the Following Order with Mixing | | | |
| Ingredient | Generic Name | Manufacturer | Pounds | |
| Water | | | 375.0 | 375.0 |
| H.E.C. | Thickener Powder | Union Carbide Corporation | — | 5.0 |
| KTPP | Potassium tripoly phosphate (dispersant) | Fisher | 1.0 | 1.0 |
| COSAN PMA-30 | Phenyl Mercuric Acetate 30% (preservative) | Troy | 0.5 | 0.5 |
| TAMOL 731 25% | Sodium Salt of Polymeric Carboxylic Acid (anionic surfactant) | Rohm & Haas Company | 6.0 | 6.0 |
| TRITON X100 | Octyl phenoxy polyethoxy ethanol (nonionic wetting agent) | Rohm & Haas Company | 2.0 | 2.0 |
| COLLOIDS 585 | Colloidal Anti-foam (anti-foam agent) | Colloids | 2.0 | 2.0 |
| Ethlene Glycol | Antifreeze Agent | Union Carbide Corporation | 15.0 | 15.0 |
| BUTYL CARBITOL | Diethylene glycol monobutyl ether (coalescing aid) | Union Carbide Corporation | 10.0 | 10.0 |
| TITANOX 2030 | Rutile Titanium Dioxide-multipurpose grade | NL Industries, Inc. | 250.0 | 250.0 |
| DRIKALITE | Calcium Carbonate | Thompson Weinman | 125.0 | 125.0 |
| ICEBERG | Aluminum Silicate (China Clay) | Burgess | 75.0 | 75.0 |
| NYTAL 300 | Magnesium Silicate (Talc) | Vanderbilt, R.T., Company | 50.0 | 50.0 |
| GRIND AT HIGH SPEED - 540 RPM - TWENTY MINUTES Add with Mixing | | | | |
| Water | | | 30.0 | 41.6 |
| UCAR 366 | Polyvinylacetate/ Acrylic Copolymer Emulsion (55% solids) | Union Carbide Corporation | 260.0 | 260.0 |
| COLLOIDS 585 | Colloidal Anti-foam (anti-foam agent) | Colloids | 2.0 | 2.0 |
| Thickener | Polymer Emulsion from Ex. 1 (30% | | 16.6 | — |

TABLE XIII-continued

LATEX ANTICORROSIVE MAINTANENCE PRIMER

| FORMULATION NO. | | | 1 | 2 |
|---|---|---|---|---|
| Add in the Following Order with Mixing | | | | |
| Ingredient | Generic Name | Manufacturer | Pounds | |
| | solids) | | | |
| | | TOTAL | 1220.1 | 1220.1 |

TABLE XIV

INTERIOR VINYL ACRYLIC FLAT LATEX PAINT

| FORMULATION NO. | 1 | 2 |
|---|---|---|
| Paint Property | | |
| Stormer Viscosity | 87 KU | 83 KU |
| ICI Cone and Plate Viscosity | 0.5 Poise | 0.7 Poise |
| Paint Film Appearance | Smooth | Smooth |
| Leveling | 4+ | 5 |
| Stability | | |
| Room Temperature (70° F.) 1 Month | Good | Good |
| 120° F. (Oven) 2 Weeks | Good | Good |
| Freeze/Thaw Stability | Fails | Passes 3 Cycles |

EXAMPLE 44

A latex metal baking primer is prepared using ingredients identified at Table XV which are mixed as indicated in the order in which they appear. The polymer emulsion prepared in accordance with Example 1 having a 30% solids content is employed as a thickener.

The polymer emulsion of this Example would impart to the resulting formulation a Stormer Viscosity of 80 to 85 KU.

TABLE XV

LEAD METAL BAKING PRIMER

Add in the Following Order with Mixing

| Ingredient | Generic Name | Manufacturer | Pounds |
|---|---|---|---|
| Water | | | 223.0 |
| IGEPAL CO-630 | Nonylphenoxypoly (ethyleneoxy) ethanol (nonionic wetting agent) | GAF Corporation | 5.0 |
| KTPP | Potassium Tripoly-phosphate | | 4.0 |
| ONCOR M50 | Basic Lead Silico Chromate | NL Industries, Inc. | 150.0 |
| RED IRON OXIDE | Pigment | Charles Pfizer | 25.0 |
| GOLD BOND R | Amorphous Silica | Tammsco, Inc. | 200.0 |
| NOPCO NXZ | Colloidal Anti-foam (anti-foam agent) | Diamond Shamrock Chemical Company | 2.0 |

GRIND AT HIGH SPEED ON A HIGH SHEER DISPERSER FOR FIFTEEN MINUTES

Add with Mixing

| PVO CEE-5 | Conjugated Epoxy Emulsion (60% solids) | | 485.0 |
|---|---|---|---|
| COBALT DRIER (6%) | Cobalt Naphthenate | Mooney Chemicals, Inc. | 4.9 |
| MANGANESE (6%) DRIER | Manganese Naphthenate | Mooney Chemicals, Inc. | 4.9 |
| IGEPAL CO-630 | Nonylphenoxy poly (ethyleneoxy) ethanol (non-ionic wetting agent) | GAF Corporation | 4.9 |
| Thickener | Polymer Emulsion from Ex. 1 (30% solids) | | 10.0 |
| | | TOTAL | 1118.7 |

- Adjust to a pH of 8.0 to 9.0 with 28% ammonium hydroxide -

EXAMPLE 45

A size press paper coating formulation is prepared using the ingredients identified at Table XVI which are mixed as indicated in the order in which they appear. The polymer emulsion prepared in accordance with Example 1 having a 30% solids content is employed as a thickener and flow control agent in this formulation.

The resulting formulation will yield a viscosity in the range of 200 to 800 centipoise.

TABLE XVI

SIZE PRESS PAPER COATING

Add in the Following Order with Mixing

| Ingredient | Generic Name | Manufacturer | Pounds |
|---|---|---|---|
| Water | | | 50.0 |
| CALGON | Sodium hexameta-phosphate | | 3.0 |
| SATINTONE No. 1 | Coating Clay #1 | Englehard Industries | 100.0 |

TABLE XVI-continued

SIZE PRESS PAPER COATING
Add in the Following Order with Mixing

| Ingredient | Generic Name | Manufacturer | Pounds |
|---|---|---|---|
| GRIND ON HIGH SPEED DISPERSER UNTIL FINENESS OF GRIND IS ACHIEVED | | | |
| Add With Mixing | | | |
| RHOPLEX B-60A | Acrylic Emulsion Paper Coating Grade (46% Solids) | Rohm & Haas Company | 39.0 |
| Water | | | 193.1 |
| Ammonium Hydroxide (28% by weight solution) | | | 0.15 |
| Thickener | Polymer Emulsion from Ex. 1 (30% solids) | | 0.9 |
| | | TOTAL | 383.3 |

EXAMPLE 46

A highly flexible, high quality latex caulk is prepared using the ingredients identified at Table XVII which are mixed as indicated in the order in which they appear. The polymer emulsion prepared in accordance with Example 1 having a 30% solids content is employed as a thickener.

The polymer thickener employed in this example will yield a caulk having a suitable viscosity and flow control and will exhibit no slump at room temperature when tested as follows:

A rectangular channel having a "U" shaped cross section made of stainless steel with inside dimensions of ¾" width by 6" length by ½" depth and having a portion of the common wall of the channel extending two inches in the direction of the channel's length beyond the walls contiguous with the common wall is filled with caulk and the excess is removed. The channel is placed in a vertical position with the 2" extension perpendicular to the ground for one hour and the degree of slump is noted.

TABLE XVII

HIGH-FLEXIBILITY, HIGH QUALITY CAULK
Blend in a Sigma Bladed Mixer

| Ingredient | Generic Name | Manufacturer | Pounds |
|---|---|---|---|
| UCAR LATEX 167 | Vinyl Copolymer Resin Emulsion (63% solids) | Union Carbide Corporation | 520.0 |
| TRITON X-405 | Octyl phenoxy polyethoxy ethanol (wetting agent) | Rohm & Haas Company | 9.0 |
| CALGON T | Sodium hexametaphosphate (anionic surfactant) | Merck & Company | 7.5 |
| SANITICIZER 160 | Polyester Plasticizer | Monsanto Company | 81.5 |
| Ethylene Glycol | Antifreeze Agent | Union Carbide Corporation | 12.5 |
| Varsol #1 | Aliphatic Hydrocarbon (solvent mixture kauri butanol value = 39) | Exxon Chemical Company | 18.5 |
| Water | | | 7.5 |
| Thickener | Polymer Emulsion from Ex. 1 (30% solids) | | 5.0 |
| Ammonium Hydroxide (28% by weight solution) | | | 3.5 |
| Blended Until Uniform, Then Add | | | |
| ATOMITE | Calcium Carbonate | Thompson Weinman | 578.0 |
| TITANOX 2030 | Titanium Dioxide Rutile-multipurpose grade | NL Industries, Inc. | 12.5 |
| | | TOTAL | 1255.5 |
| Blend for 1.5 Hours Until Uniform | | | |

EXAMPLE 47

This example illustrates the use of the polymer of the present invention as a rheological control agent in aqueous based adhesives.

Thus, a removable pressure-sensitive adhesive is prepared using ingredients identified at Table XVIII which are mixed as indicated in the order in which they appear. The polymer emulsion prepared in accordance with Example 1 having a 30% solids content is employed as a thickener. The polymer thickener employed in this example will impart the desired thickening effect to the resulting adhesive formulation.

TABLE XVIII
REMOVABLE PRESSURE-SENSITIVE ADHESIVE FORMULATION
Mix in the Following Order Until Uniform

| Ingredient | Generic Name | Manufacturer | Parts/100 Parts Emulsion |
|---|---|---|---|
| RHOPLEX N-580 | Acrylic Resin Emulsion (55% solids) | Rohm & Haas Company | 100.0 |
| TRITON X-100 | Octyl phenoxy polyethoxy ethanol (nonionic) (20% water) | Rohm & Haas Company | 0.14 |
| TRITON GR-5M | Dioctyl sodium sulfosuccinate (anionic) | Rohm & Haas Company | 0.09 |
| NOPCO NXZ | Colloidal Anti-foam (anti-foam agent) | Diamond Shamrock Chemical Company | 0.20 |
| Ammonium Hydroxide (28% by weight solution) | | | 0.05 |
| Thickener | Polymer Emulsion from Ex. 1 (30% solids) | | 0.56 |
| | | TOTAL | 101.04 |

EXAMPLE 48

An aqueous based cosmetic formulation may be prepared using the ingredients identified at Table XIX which are mixed as indicated in the order in which they appear. The polymer emulsion prepared in accordance with Example 1 having a 30% solids content is employed as the thickener.

The resulting formulation would yield a viscosity of 1,500 centipoise and excellent suspension of the insoluble ingredients would be obtained.

TABLE XIX
ACNE CREAM LOTION

| Ingredient | Parts (by weight) |
|---|---|
| A. In a Powder Blender Add: | |
| Cosmetic grade talc | 10.05 |
| Cosmetic grade Titanium dioxide | 3.00 |
| Allantion | 0.20 |
| Resorcinol, U.S.P. | 0.50 |
| Colloidal Sulfur | 1.00 |
| Cosmetic Yellow, yellow iron oxide | 0.02 |
| Cosmetic Brown, raw umber | 0.02 |
| Cosmetic Pink, red ironoxide/talc | 0.03 |
| Blend for 20 Minutes and Then Micropulverize | |
| B. In another vessel, add, mix and heat to 65° C.: | |

TABLE XIX-continued
ACNE CREAM LOTION

| Ingredient | Parts (by weight) |
|---|---|
| Water, deionized | 73.75 |
| Methylparaben | 0.25 |
| Propylene glycol | 4.00 |
| Glycerol monostearate | 1.00 |
| C. Using a mixer at medium speed add: | |
| Polymer Emulsion from Ex. 1 (30% solids) | 6.00 |
| Mix Until Uniform | |
| TOTAL | 100.00 |

With continuous mixing add A to B and mix together for 15 minutes. Continue to mix slowly while cooling to room temperature.

EXAMPLE 49

A styrene-butadiene resin based acoustical tile coating may be prepared using the ingredients indentified at Table XX. The polymer emulsion prepared in accordance with Example 1 having a 30% solids content may be employed as a thickener.

The resulting formulation would achieve a Stormer Viscosity of 75 KU, which is necessary for proper coating of the acoustical tiles.

TABLE XX
ACOUSTICAL TILE COATING
Add in the Following Order with Mixing

| Ingredient | Generic Name | Manufacturer | Pounds |
|---|---|---|---|
| Water | | | 200.0 |
| DAXAD 30 | Sodium Salt of Polymeric Carboxylic Acid (dispersant) | W.R. Grace Company | 4.0 |
| Ammonium Hydroxide (28% by weight solution) | | | 2.0 |
| METASOL TK-100 | 2-(4-thiazolyl) benzimidzole (preservative) | Merck & Company | 0.13 |
| COLLOIDS 707 | Colloidal Antifoam Agent | Colloids | 3.0 |
| Ethylene Glycol | Antifreeze Agent | | 15.0 |
| ASP-170 | Aluminum Silicate | Englehard Industries | 179.0 |
| CHEMCARB #55 | Calcium Carbonate | Englehard Industries | 187.0 |
| TITANOX 2030 | Rutile Titanium Dioxide | NL Industries, Inc. | 100.0 |
| IGEPAL CO-630 | Nonylphenoxypoly (ethyleneoxy) ethanol (wetting agent) | GAF Corporation | 2.0 |

TABLE XX-continued

ACOUSTICAL TILE COATING
Add in the Following Order with Mixing

| Ingredient | Generic Name | Manufacturer | Pounds |
|---|---|---|---|
| GRIND AT HIGH SPEED ON A HIGH SHEAR DISPERSER FOR FIFTEEN MINUTES | | | |
| Add with Mixing | | | |
| DOW 360 | Styrene Butadiene Latex Emulsion-Coating Grade (48% Solids) | DOW Chemical Company | 187.0 |
| Water | | | 243.0 |
| Thickener | Polymer Emulsion from Ex. 1 (30% solids) | | 12.0 |
| | | TOTAL | 1134.18 |

EXAMPLE 50

A blue pen ink formulation may be prepared using ingredients at Table XXI which are mixed as indicated in the order in which they appear. The polymer emulsion prepared in accordance with Example 1 having a 30% solids content may be employed as a thickener.

The resulting formulation will possess the desired thickening and flow control.

TABLE XXI

BLUE PEN INK FORMULATION
Add in the Following Order with Mixing

| Ingredient | Parts (by Weight) |
|---|---|
| Ethylene Glycol | 60.0 |
| Water | 7.5 |
| Phthalocyanine Blue | 30.0 |
| Disperse at high shear until desired fineness of grind is obtained | |
| Polymer Emulsion from Ex. 1 (30% solids) | 2.5 |
| TOTAL | 100.0 |
| Adjust pH to 9.0 with Ammonium Hydroxide (28% by weight solution) | |

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A polymer of (a) from about 15 to about 35% by weight, of methacrylic acid, (b) from about 5 to about 70% by weight, of at least one ester of methacrylic acid represented by the structural formula:

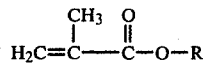

wherein R is saturated or unsaturated and represents an alkyl group having from 1 to 20 carbon atoms, and (c) from about 5 to about 80% by weight, of at least one vinyl ester of a saturated aliphatic carboxylic acid, wherein the acid has from 1 to 10 carbon atoms.

2. The polymer of claim 1 wherein the ester of methacrylic acid is methyl methacrylate and the vinyl ester of the saturated aliphatic carboxylic acid is vinyl acetate.

3. The polymer of claim 1 consisting essentially of from about 20 to about 35% by weight methacrylic acid, from about 10 to about 50% by weight methyl methacrylate, and from about 20 to about 60% by weight vinyl acetate.

4. The polymer of claim 1 consisting essentially of about 30% by weight methacrylic acid, about 30% by weight methyl methacrylate, and about 40% by weight vinyl acetate.

5. The polymer of claim 1 which has been converted to a solid salt.

6. An aqueous polymer emulsion useful as a thickening agent in aqueous compositions when the polymer is dissolved therein, which comprises water and emulsified polymer particles prepared from monomers consisting essentially of (a) from about 15 to about 35% by weight, of methacrylic acid, (b) from about 5 to about 70% by weight, of at least one ester of methacrylic acid represented by the structural formula:

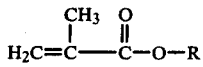

wherein R is saturated or unsaturated and represents an alkyl group having from 1 to 20 carbon atoms, and (c) from about 5 to about 80% by weight, of at least one vinyl ester of a saturated aliphatic carboxylic acid, wherein the acid has from 1 to 10 carbon atoms.

7. The aqueous polymer emulsion of claim 6 wherein R is saturated or unsaturated and represents an alkyl group having from 1 to 12 carbon atoms, and wherein the saturated aliphatic carboxylic acid has from 1 to 6 carbon atoms.

8. The aqueous polymer emulsion of claim 6 wherein the ester of methacrylic acid is methyl methacrylate and the vinyl ester of the saturated aliphatic carboxylic acid is vinyl acetate.

9. The aqueous polymer emulsion of claim 6 wherein the polymer is prepared from monomers consisting essentially of from about 20 to about 35% by weight methacrylic acid, from about 10 to about 50% by weight methyl methacrylate, and from about 20 to about 60% by weight vinyl acetate.

10. The aqueous polymer emulsion of claim 9 wherein the polymer is present therein in an amount of about 25 to about 35% by weight of the emulsion.

11. The aqueous polymer emulsion of claim 6 wherein the polymer is a terpolymer prepared from about 30% by weight methacrylic acid, about 30% by weight methyl methacrylate, and about 40% by weight vinyl acetate, and wherein the polymer is present therein in an amount of about 25 to about 35% by weight of the emulsion.

12. In a latex paint composition comprising water, pigment, and thickener, the improvement which comprises having as at least a portion of the thickener dissolved therein a polymer prepared from monomers consisting essentially of (a) from about 15 to about 35% by weight, of methacrylic acid, (b) from about 5 to about 70% by weight, of at least one ester of methacrylic acid represented by the structural formula:

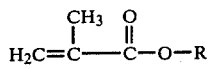

wherein R is saturated or unsaturated and represents an alkyl group having from 1 to 20 carbon atoms, and (c) from about 5 to about 80% by weight, of at least one vinyl ester of a saturated aliphatic carboxylic acid, wherein the acid has from 1 to 10 carbon atoms.

13. The latex paint composition of claim 12 wherein the polymer is prepared from monomers consisting essentially of from about 20 to about 35% by weight methacrylic acid, from about 10 to about 50% by weight methyl methacrylate, and from about 20 to about 60% by weight vinyl acetate, and wherein the polymer is dissolved in said paint composition in an amount of from about 0.05 to about 5% by weight of the composition.

14. The latex paint composition of claim 13 wherein the polymer is dissolved in said paint composition in an amount of from about 0.1 to about 3% by weight of the composition, and wherein the pH of the paint composition is from about 6.2 to about 12.

15. The latex paint composition of claim 14 wherein the polymer is a terpolymer prepared from about 30% by weight methacrylic acid, from about 30% by weight methyl methacrylate, and from about 40% by weight vinyl acetate, and wherein the pH of the paint composition is from about 8 to about 10.

16. A process for thickening an aqueous composition which comprises:
(I) adding a polymer to the aqueous composition which polymer is prepared by polymerizing monomers consisting essentially of:
(a) from about 15 to about 35% by weight, of methacrylic acid, (b) from about 5 to about 70% by weight, of at least one ester of methacrylic acid represented by the structural formula:

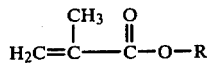

wherein R is saturated or unsaturated and represents an alkyl group having from 1 to 20 carbon atoms, and (c) from about 5 to about 80% by weight, of at least one vinyl ester of a saturated aliphatic carboxylic acid, wherein the acid has from 1 to 10 carbon atoms, and
(II) dissolving the polymer in the aqueous composition.

17. The process of claim 16 wherein the polymer is prepared by polymerizing monomers consisting essentially of from about 20 to about 35% by weight methacrylic acid, from about 10 to about 50% by weight methyl methacrylate, and from about 20 to about 60% by weight vinyl acetate, wherein the polymer is dissolved in said aqueous composition in an amount of about 0.05 to about 20% by weight of the composition, and wherein the pH of the aqueous composition is from about 6.2 to about 12.

18. The process of claim 17 wherein the polymer is added to the aqueous composition as an emulsion of said polymer in water, and wherein the polymer is present in said emulsion prior to its addition to the aqueous composition in an amount of about 25 to about 35% by weight of the emulsion.

19. The process of claim 16 wherein the polymer is added to the aqueous composition as a solid salt.

20. The process of claim 16 wherein the polymer is prepared by polymerizing monomers consisting essentially of about 30% by weight methacrylic acid, about 30% by weight methyl methacrylate, and about 40% by weight vinyl acetate, and wherein the polymer is dissolved in said aqueous composition in an amount of about 0.1 to about 5% by weight of the composition.

21. The process of claim 17 wherein the aqueous composition is a latex paint composition, wherein the polymer is dissolved in said paint composition in an amount of about 0.05 to about 5% by weight of the paint composition, and wherein the pH of the paint composition is from about 8 to about 10.

22. The process of claim 21 wherein the latex paint composition is an acrylic based latex paint composition.

23. In an aqueous composition comprising water and thickener, the improvement which comprises having as at least a portion of the thickener dissolved therein a polymer prepared from monomers consisting essentially of (a) from about 15 to about 35% by weight, of methacrylic acid, (b) from about 5 to about 70% by weight, of at least one ester of methacrylic acid represented by the structural formula:

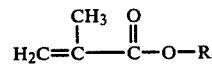

wherein R is saturated or unsaturated and represents an alkyl group having from 1 to 20 carbon atoms, and (c) from about 5 to about 80% by weight, of at least one vinyl ester of a saturated aliphatic carboxylic acid, wherein the acid has from 1 to 10 carbon atoms.

* * * * *